(12) United States Patent
Jung et al.

(10) Patent No.: US 10,964,937 B2
(45) Date of Patent: Mar. 30, 2021

(54) NEGATIVE ACTIVE MATERIAL, LITHIUM SECONDARY BATTERY INCLUDING THE SAME, AND METHOD OF MANUFACTURING THE NEGATIVE ACTIVE MATERIAL

(71) Applicants: Samsung Electronics Co., Ltd., Suwon-si (KR); Samsung SDI Co., Ltd., Yongin-si (KR)

(72) Inventors: Heechul Jung, Gunpo-si (KR); Woojin Bae, Yongin-si (KR); Guesung Kim, Suwon-si (KR); Koichi Takei, Hwaseong-si (KR); Seongho Jeon, Pohang-si (KR); Sungsoo Han, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 56 days.

(21) Appl. No.: 16/137,863

(22) Filed: Sep. 21, 2018

(65) Prior Publication Data
US 2019/0097220 A1 Mar. 28, 2019

(30) Foreign Application Priority Data
Sep. 26, 2017 (KR) .................. 10-2017-0124528

(51) Int. Cl.
*H01M 4/36* (2006.01)
*H01M 10/0525* (2010.01)
(Continued)

(52) U.S. Cl.
CPC ......... *H01M 4/366* (2013.01); *H01M 4/0471* (2013.01); *H01M 4/134* (2013.01);
(Continued)

(58) Field of Classification Search
None
See application file for complete search history.

(56) References Cited

U.S. PATENT DOCUMENTS

| 7,816,031 B2 | 10/2010 | Cui et al. |
| 8,241,793 B2 | 8/2012 | Zhamu et al. |
| (Continued) | | |

FOREIGN PATENT DOCUMENTS

| JP | 2016028382 A | 2/2016 |
| KR | 100918050 B1 | 9/2009 |
| (Continued) | | |

OTHER PUBLICATIONS

Taeri Kwon et al., "Carbon-coated mesoporous silica as an electrode material," Microporous and Mesoporous Materials, Mar. 25, 2010, pp. 421-427, vol. 132.

*Primary Examiner* — Karie O'Neill Apicella
(74) *Attorney, Agent, or Firm* — Cantor Colburn LLP

(57) ABSTRACT

A negative active material including an active material core; and a polymer layer disposed on a surface of the active material core, wherein the polymer layer includes a third polymer including a cross-linked product of a first polymer and a second polymer, wherein the first polymer is at least one of polyamic acid, polyimide, or a combination thereof, and includes a first functional group; and the second polymer is water-soluble and includes a second functional group, and wherein the first polymer and the second polymer are cross-linked by an ester bond that is formed through at least one reaction starting from the first functional group and the second functional group, and at least one of the first polymer and the second polymer further includes a halogen group.

28 Claims, 12 Drawing Sheets

(51) Int. Cl.
  *H01M 4/137* (2010.01)
  *H01M 4/38* (2006.01)
  *H01M 4/04* (2006.01)
  *H01M 4/583* (2010.01)
  *H01M 4/134* (2010.01)
  *H01M 4/62* (2006.01)
  *H01M 4/139* (2010.01)
  *H01M 4/02* (2006.01)

(52) U.S. Cl.
  CPC ........... *H01M 4/137* (2013.01); *H01M 4/139* (2013.01); *H01M 4/386* (2013.01); *H01M 4/583* (2013.01); *H01M 4/622* (2013.01); *H01M 4/623* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 8,753,545 B2 | 6/2014 | Obrovac et al. |
| 9,692,049 B2 | 6/2017 | Hwang et al. |
| 2009/0087748 A1 | 4/2009 | Choi et al. |
| 2010/0273058 A1 | 10/2010 | Lee |
| 2010/0288077 A1 | 11/2010 | Le |
| 2012/0121977 A1 | 5/2012 | Xu et al. |
| 2013/0088506 A1 | 4/2013 | Yun et al. |
| 2013/0130115 A1 | 5/2013 | Park et al. |
| 2014/0087255 A1 | 3/2014 | Kim et al. |
| 2014/0170484 A1 | 6/2014 | Fukahori |
| 2014/0356711 A1* | 12/2014 | Kasahara ............... H01M 4/134 429/217 |
| 2015/0147649 A1 | 5/2015 | Jung et al. |
| 2015/0243969 A1 | 8/2015 | Ku et al. |
| 2016/0093879 A1 | 3/2016 | Song et al. |
| 2016/0099463 A1 | 4/2016 | Lee et al. |
| 2016/0126544 A1 | 5/2016 | Fan |
| 2016/0315311 A1 | 10/2016 | Jeon et al. |
| 2017/0077497 A1 | 3/2017 | Ogata et al. |
| 2017/0077498 A1* | 3/2017 | Fukasawa ......... H01M 10/0525 |
| 2017/0092939 A1 | 3/2017 | Kim et al. |
| 2018/0026270 A1* | 1/2018 | Bae ....................... H01M 4/364 429/217 |
| 2018/0083272 A1 | 3/2018 | Son et al. |

FOREIGN PATENT DOCUMENTS

| | | |
|---|---|---|
| KR | 1020130037019 A | 4/2013 |
| KR | 1020140079702 A | 6/2014 |
| KR | 1020140106292 A | 9/2014 |
| KR | 1020140120751 A | 10/2014 |
| KR | 1020150064947 A | 6/2015 |
| KR | 1020170033123 A | 3/2017 |
| KR | 1020170036417 A | 4/2017 |

\* cited by examiner

NEGATIVE ACTIVE MATERIAL, LITHIUM SECONDARY BATTERY INCLUDING THE SAME, AND METHOD OF MANUFACTURING THE NEGATIVE ACTIVE MATERIAL

CROSS-REFERENCE TO RELATED APPLICATION

This application claims priority to and the benefit of Korean Patent Application No. 10-2017-0124528, filed on Sep. 26, 2017, in the Korean Intellectual Property Office, and all the benefits accruing therefrom under 35 U.S.C. § 119, the disclosure of which is incorporated herein in its entirety by reference.

BACKGROUND

1. Field

The present disclosure relates to a negative active material, a lithium secondary battery including the negative active material, and a method of manufacturing the negative active material.

2. Description of the Related Art

Lithium ion batteries (LIBs) have been a major power source for mobile electronic devices for decades due to their high energy density and ease of design. In the future, the range of applications of LIBs will be expanded to electric vehicles and renewable energy power storage devices. In order to meet such demands in the market, studies on LIB materials having high energy density and long lifetime characteristics have continued. Various materials such as silicon, tin, germanium, and carbon have been studied as negative electrode materials for LIBs.

In particular, the use of silicon materials have been proposed because they exhibit about 10 times greater energy density per weight and about 2 to 3 times greater energy density per volume when compared to graphite materials. However, the use of a silicon negative electrode material may result in deteriorated electrochemical characteristics since an unstable SEI layer is formed due to a side reaction between a silicon surface and an electrolyte, or may cause the breakdown of an electrode material due to high internal stress caused by sudden volume expansion during a charging/discharging process.

In order to solve this problem, work has been performed to improve the reversibility of the active material through microfabrication of the active material, introduction of an inert substrate, and use of a surface treatment. Carbon materials, which are mixed conductors capable of conducting both lithium ions and electrons, have attracted much attention. Carbon materials are widely used as surface coating materials and as composite materials in commercial products, and may be used to compensate for the disadvantages of silicon active materials. However, the breaking strength and flexibility of such carbon materials may be insufficient to withstand stress caused by expansion of silicon active materials. Even when a silicon active material is compounded or surface-treated with a carbon material, fine cracks may be generated on a surface of the resulting material due to expansion of the active material during charging and discharging resulting from insufficient flexibility characteristics. In this regard, an irreversible lithium consumption reaction may occur due to the occurrence of fine cracks that can result in the internal invasion of the electrolyte into the pores of the active material.

Therefore, there is a need for improving the reversibility of lithium ions in a lithium secondary battery by preventing the formation of cracks in a high-capacity negative active material and minimizing side reactions between an electrolyte and the negative active material.

SUMMARY

Provided is a negative active material that may improve lifetime characteristics of a lithium secondary battery by preventing the formation of cracks in an active material and minimizing a side reaction on a surface of the active material.

Provided is a lithium secondary battery including the negative active material.

Provided is a method of manufacturing the negative active material.

Additional aspects will be set forth in part in the description which follows and, in part, will be apparent from the description, or may be learned by practice of the presented embodiments.

According to an aspect of an embodiment, a negative active material includes an active material core; and a polymer layer disposed on a surface of the active material core, wherein the polymer layer includes a third polymer including a cross-linked product of a first polymer and a second polymer, wherein the first polymer is at least one of polyamic acid, polyimide, or a copolymer thereof, and includes a first functional group; wherein the second polymer is water-soluble and includes a second functional group, and wherein the first polymer and the second polymer are cross-linked by an ester bond that is formed through at least one reaction starting from the first functional group and the second functional group, and at least one of the first polymer and the second polymer further includes a halogen group.

According to an aspect of another embodiment, a lithium secondary battery includes the negative active material.

According to an aspect of another embodiment, a method of manufacturing a negative active material includes: mixing a first composition and a second composition to prepare a third composition, wherein, the first composition includes a first polymer and a non-aqueous solvent, the first polymer including a first functional group and being at least one of polyamic acid, polyimide, or a copolymer thereof, the second composition includes water and a second polymer including a second functional group, wherein the second polymer is water-soluble, and at least one of the first polymer and the second polymer further includes a halogen group; contacting a surface of an active material core and the third composition to form a coated surface; and heat-treating the coated surface at a temperature of about 160° C. or greater to form a polymer layer including a third polymer on the surface of the active material core, wherein the third polymer is a cross-linked product of the first polymer and the second polymer, and the first polymer and the second polymer are cross-linked by an ester bond that is formed by a reaction of the first functional group and the second functional group.

BRIEF DESCRIPTION OF THE DRAWINGS

These and/or other aspects will become apparent and more readily appreciated from the following description of the embodiments, taken in conjunction with the accompanying drawings in which:

FIG. 5A to 5D show the results of scanning electron microscopy-energy dispersive X-ray spectroscopy (SEM-EDX) analysis of the negative active material of Example 1, in which FIG. 5A is a backscattered electron image, FIG. 5B is an element map for oxygen and fluorine, FIG. 5C is an element map for oxygen, and FIG. 5D is an element map for fluorine;

DETAILED DESCRIPTION

Figure 1:
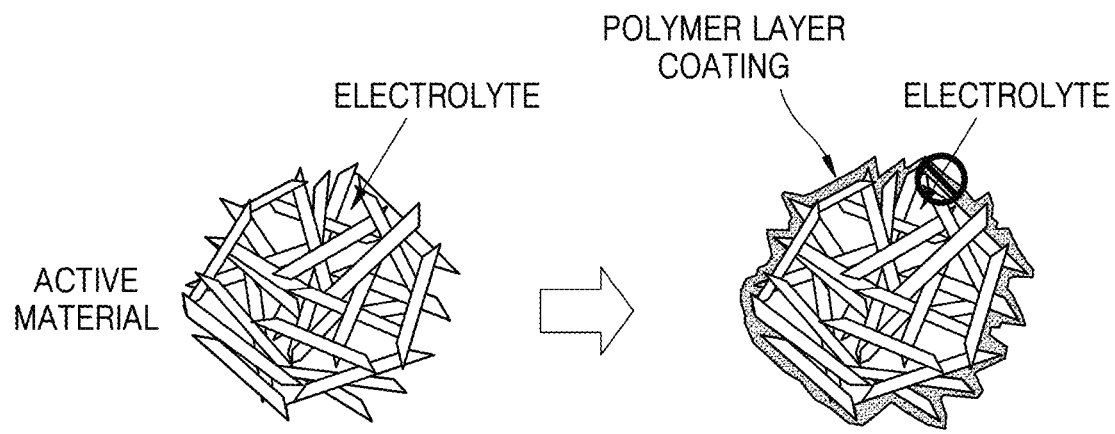
FIG. 1 is a schematic view illustrating a polymer surface treatment of a negative active material, according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

As used herein, the term "and/or" includes any and all combinations of one or more of the associated listed items. "Or" means "and/or." The singular forms "a," "an," and "the" are intended to include the plural forms. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Hereinafter, according to one or more exemplary embodiments, a negative active material, a lithium secondary battery including the negative active material, and a method of manufacturing the negative active material will be described in detail.

According to an embodiment, a negative active material includes an active material core; and a polymer layer disposed on a surface of the active material core, wherein the polymer layer includes a third polymer that is a cross-linked product of a first polymer and a second polymer, wherein the first polymer is at least one of polyamic acid, polyimide, or a copolymer thereof and includes a first functional group; the second polymer is water-soluble and comprises a second functional group, and wherein the first polymer and the second polymer are cross-linked by an ester bond that is formed through at least one reaction starting from the first functional group and the second functional group, and at least one of the first polymer and the second polymer further includes a halogen group. That is, the first polymer and the second polymer are cross-linked by an ester bond that is formed by a reaction of the first functional group and the second functional group.

The halogen group may be a halogen atom, a halogen-containing group, or a combination thereof. The halogen group may be a halogen atom. The halogen atom may be a fluorine atom, a chlorine atom, a bromine atom, an iodine atom, or a combination thereof. For example, the halogen atom may be a fluorine atom.

The negative active material may improve Coulombic efficiency and lifetime characteristics of a lithium battery by surface-treating a surface of the active material core with a polymer material having a particular functional group and suppressing decrease of the active material due to irreversible consumption of lithium ions and destruction of secondary particles during charging/discharging.

FIG. 1 is a schematic view to illustrate a polymer layer disposed on a surface of an active material core according to an embodiment.

As shown in the left side of FIG. 1, in the case of an active material secondary particle formed by agglomerating active material primary particles, fine cracks may be generated in the secondary particle due to the expansion and contraction of the active material secondary particle during charging and discharging. An electrolyte may invade into a new fracture thus formed or into a porous internal structure of the active material secondary particle, and may result in the irreversible consumption of lithium ions due to a side reaction with the active material. In the right side of FIG. 1, when a surface of the active material secondary particle is surface-treated with a polymer layer coating, cracks in the active material may be prevented, and a side reaction between the electrolyte and the active material may be minimized, which may prevent the irreversible consumption of e lithium ions, and thus the reversibility of lithium ions in the battery may be improved.

Figure 2:
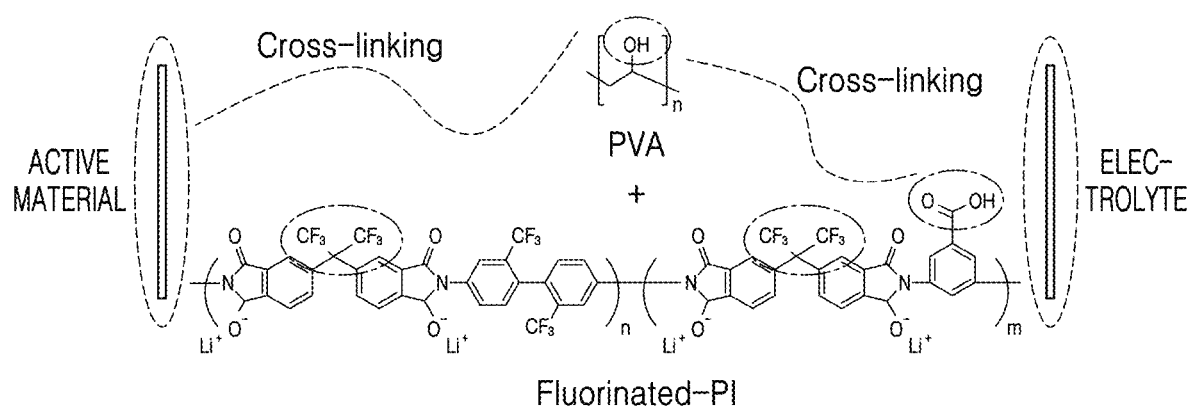
FIG. 2 is a schematic view that illustratively describes a structure and a function of a polymer layer in the negative active material, according to an embodiment.

FIG. 2 is a view that illustratively describes a structure and a function of a polymer layer in the negative active material according to an embodiment.

As shown in FIG. 2, for example, a polymer layer may be formed on a surface of the active material core by using a third polymer that includes a cross-linked product of a first polymer (fluorinated-PI) including a carboxyl group and a fluorine atom and a second polymer (PVA) including a hydroxyl group. Here, a carboxyl group of the first polymer and a hydroxyl group of the second polymer react with each other and form an ester bond to form the third polymer in which the first polymer and the second polymer are cross-linked. Here, when a functional group that may be bonded to form an ester bond, such as a hydroxyl group, further exists on a surface of the active material core, a portion of the carboxyl groups of the first polymer may form a cross-linking bond via an ester bond with the functional groups existing on the surface of the active material core. When the functional group on the surface of the active material core further includes a carboxyl group, a portion of the hydroxyl groups of the second polymer may form a cross-linking bond via an ester bond with the carboxyl groups existing on the surface of the active material core. In this regard, the polymer layer disposed on the surface of the active material core may improve structural stability of the active material core and may improve interface stability by decreasing formation of irreversible lithium-containing products when the halogen group such as a fluorine atom is used.

The active material core in the negative active material according to an embodiment may be any suitable material that is capable of intercalating and deintercalating lithium ions and exhibiting a high capacity as a negative active material in a lithium battery.

In an embodiment, the active material core may include at least one of a silicon active material, a tin active material, a silicon-tin alloy active material, and a silicon-carbon active material. For example, the active material core may be Si, $SiO_x$ (where $0<x<2$), a Si—Z alloy (where Z is an alkali metal, an alkali earth metal, a Group XIII element to a Group XVI element, a transition metal, a rare earth element, or a combination thereof, and Z is not Si), Sn, $SnO_2$, and a Sn—Z alloy (where Z is an alkali metal, an alkali earth metal, a Group XIII element to a Group XVI element, a transition metal, a rare earth element, or a combination thereof, and Z is not Sn); or may be a mixture of $SiO_2$ and at least one selected therefrom. In some embodiments, Z may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof. The active material core may be a single material used alone or the active material may be a combination of at least two active materials provided herein.

In an embodiment, the active material core may include a silicon-carbon composite. For example, the active material core may include a silicon secondary particle in which silicon primary particles are agglomerated; and a carbonaceous material including crystalline carbon, amorphous carbon, or a combination thereof.

The active material core may have a porous structure or a nonporous structure.

In an embodiment, the active material core may include a porous silicon composite cluster, the porous silicon composite cluster may include a core which includes a porous silicon composite secondary particle; and a shell which is disposed on the core and includes second graphene, wherein the porous silicon composite secondary particle may include an agglomerate of at least two silicon composite primary particles, and the silicon composite primary particles may include silicon; a silicon oxide ($SiO_x$, where $0<x<2$) disposed on the silicon; and first graphene disposed on the silicon oxide.

The porous silicon composite cluster is disclosed in the Korean Patent Application No. 10-2016-0119557, and the specification filed with the Korean Intellectual Property Office is incorporated by reference herein in its entirety.

A polymer layer is disposed on a surface of the active material core, for example by surface-treatment of a polymer material as described herein.

The polymer layer includes a third polymer that is a cross-linked product of a first polymer and a second polymer, wherein the first polymer is at least one of polyamic acid, polyimide, or a copolymer thereof and includes a first functional group; the second polymer is water-soluble and includes a second functional group, wherein the first polymer and the second polymer are cross-linked by an ester bond that is formed through at least one reaction starting from the first functional group and the second functional group, and at least one of the first polymer and the second polymer further includes a halogen group. In other words, the ester bond is formed by reaction of the first functional groups and the second functional group of the respective polymers.

The term "halogen group" refers to a halogen atom, a halogen-containing group, or a combination thereof. The halogen group may be a halogen atom. The halogen atom may be a fluorine atom, a chlorine atom, a bromine atom, an iodine atom, or a combination thereof. For example, the halogen atom may be a fluorine atom.

As used herein, the term "cross-link" refers to a bond that links one polymer chain to another polymer chain. As used herein, the term "cross-linking bond" refers to a covalent bond. As used herein, the term "linker" or "cross-linker" refers to a functional group that links one polymer chain to another polymer chain. As used herein, the term "cross-linked polymer" refers to a polymer in which one polymer chain and another polymer chain are connected with at least one linker. Also, the cross-linked polymer is a cross-linked product of at least one polymer.

The third polymer, forming a polymer layer, is a cross-linked product of the first polymer and the second polymer. When the first polymer and the second polymer form the polymer layer including the third polymer, which is a cross-linked polymer that is cross-linked by at least one ester bond, structural stability and interface stability of the active material core may improve. In this regard, cracks of the active material core may be prevented or minimized, and a side reaction between an electrolyte and the active material core may decrease, which may thus improve reversibility of lithium ions in a lithium battery.

In the polymer layer comprising the third polymer, the first functional group and the second functional group included in the first polymer and the second polymer, respectively, may be each independently at least one of a carboxyl group, a hydroxyl group, and optionally an amide group, and an aldehyde group, but embodiments are not limited thereto, and any suitable material having the first functional group and the second functional group that is capable of forming a cross-linking bond including an ester bond by reacting the first functional group and the second functional group may be used. For example, the first functional group may be a carboxyl group (—COOH), and the second functional group may be a hydroxyl group (—OH). The carboxyl group and the hydroxyl group may react and form an ester cross-linking bond. In the first polymer, the first functional group may be linked to a side chain of a divalent aromatic group and not linked to a tetravalent aromatic group that is included in a polyamic acid or a polyimide. Other covalent bonds may be formed when an amide or aldehyde group is included.

At least one of the first polymer and the second polymer further includes a halogen group. The halogen group may be a halogen atom, a halogen-containing group, or a combination thereof. The halogen atom may be a fluorine atom, a chlorine atom, a bromine atom, or an iodine atom. For example, the halogen atom may be a fluorine atom.

For example, at least one of the first polymer and the second polymer may be substituted with a fluorine atom or a perfluoroalkyl group. The fluorine atom may decrease formation of irreversible lithium-containing products on a surface of the active material core and thus may improve interface stability.

In the polymer layer, the first polymer may further include an alkali metal (i.e., an alkali metal ion). The alkali metal may be sodium or lithium. The first polymer may be substituted or doped with an alkali metal. For example, in polyamic acid, a hydrogen of a carboxyl group linked to a tetravalent aromatic group in polyamic acid may be substituted with an alkali metal ion (i.e., an alkali metal cation). For example, in polyimide, the first polymer may be doped with an alkali metal ion and coordinated to an amide group. When the first polymer includes an alkali metal (e.g., is pre-lithiated), an initial charging/discharging efficiency may improve.

An amount of the alkali metal in the first polymer may be in a range of about 0.2 equivalents to about 1 equivalent ratio with respect to a total content of carboxyl groups, amide groups, and carbonyl groups of the first polymer. For example, an amount of the alkali metal in the first polymer may be in a range of about 0.2 equivalents to about 0.8 equivalents with respect to a total content of carboxyl groups, amide groups, and carbonyl groups. For example, an amount of the alkali metal in the first polymer may be in a range of about 0.3 equivalents to about 0.7 equivalents with respect to a total amount of carboxyl groups, amide groups, and carbonyl groups. For example, an amount of the alkali metal in the first polymer may be in a range of about 0.4 equivalents to about 0.6 equivalents with respect to a total amount of carboxyl groups, amide groups, and carbonyl groups. For example, an amount of the alkali metal in the first polymer may be in a range of about 0.45 equivalents to about 0.55 equivalents with respect to a total amount of carboxyl groups, amide groups, and carbonyl groups. When the amount of the alkali metal is within these ranges, physical properties of the active material may improve.

When an amount of lithium or an ion substitution degree of lithium ions in polyamic acid is less than about 0.2 equivalents with respect to a total amount of carboxyl groups and amide groups, a ratio of prelithiation decreases, and thus an effect of suppressing the formation of irreversible lithium-containing products at the first cycle is not significant. Also, when an amount of lithium or an ion substitution degree of lithium ions in polyamic acid is greater than about 1 equivalent with respect to a total amount of carboxyl groups and amide groups, a ratio of imidification may significantly decrease and thus lifetime characteristics of the lithium battery may be deteriorated. The amount of lithium, or lithium ion substitution degree, within this range may be obtained by adding an amount of LiOH used for lithiating polyamic acid at an amount in a range of about 0.2 equivalents to about 1 equivalent with respect to a total amount of carboxyl groups and amide groups of polyamic acid.

In an embodiment, the polyamic acid may be a compound represented by at least one of Formula 1 or Formula 2:

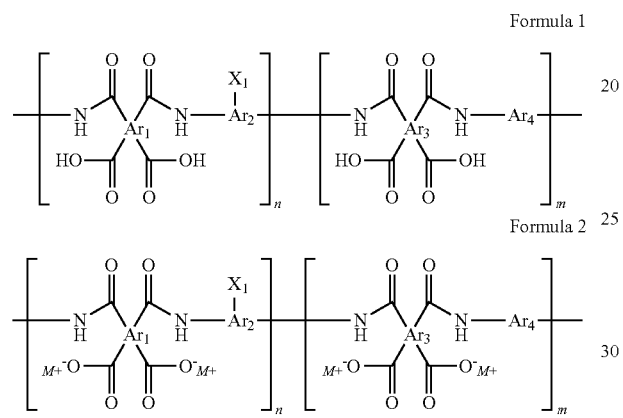

In Formulae 1 and 2, each M is the same or different, and is an alkali metal; each $Ar_1$ and $Ar_3$ are the same or different, and are each independently at least one aromatic group that is a substituted or unsubstituted tetravalent C6-C24 arylene group or a substituted or unsubstituted tetravalent C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si($R_a$)($R_b$)— wherein $R_a$ and $R_b$ are each independently a C1-C10 alkyl group, a substituted or unsubstituted C1-C10 alkylene group, or —C(=O)—NH—; each $Ar_2$ and $Ar_4$ are the same or different, and are each independently at least one aromatic group that is a substituted or unsubstituted C6-C24 arylene group or a substituted or unsubstituted C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si($R_a$)($R_b$)— wherein $R_a$ and $R_b$ are each independently a C1-C10 alkyl group, a substituted or unsubstituted C1-C10 alkylene group, or —C(=O)—NH—; at least one of $Ar_1$ to $Ar_4$ is substituted by a halogen group; each $X_1$ is the same or different, is the first functional group, and is —COOH, —OH, —CO—NH$_2$, or —COH; and n and m are each mole fractions in repeating units, wherein n and m for Formulae 1 and 2 each independently satisfy 0<n≤1, 0≤m<1, and n+m=1.

The halogen group may be a halogen atom, a halogen-containing group, or a combination thereof. The halogen group may be a halogen atom. The halogen atom may be a fluorine atom, a chlorine atom, a bromine atom, or an iodine atom. For example, the halogen atom may be a fluorine atom.

In Formulae 1 and 2, $Ar_1$ and $Ar_3$ are each independently at least one of Formulae 1a and 1b, and $Ar_2$ and $Ar_4$ are each independently at least one of Formulae 1c to 1e:

Formula 1a

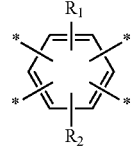

Formula 1b

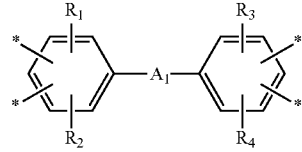

Formula 1c

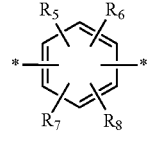

Formula 1d

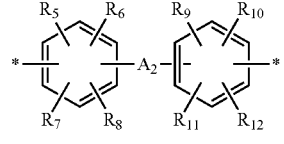

Formula 1e

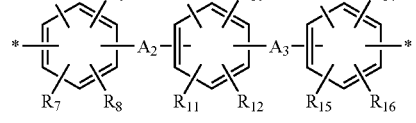

In Formulae 1a to 1e, $R_1$ to $R_{16}$ are each independently hydrogen, a halogen atom, —COOH, —OH, —CO—NH$_2$, —COH, a C1-C10 alkyl group substituted or not substituted with a halogen atom, a C6-C20 aryl group substituted or not substituted with a halogen atom, or a C2-C20 heteroaryl group substituted or not substituted with a halogen atom, wherein at least one of $R_1$ to $R_{16}$ is a halogen group or is substituted by a halogen group; and $A_1$ to $A_3$ are each independently a single bond, —O—, —C(=O)—, —S—, —S(=O)$_2$—, —Si($R_a$)($R_b$)— wherein $R_a$ and $R_b$ are each independently a C1-C10 alkyl group, a C1-C10 alkylene group substituted or not substituted with a halogen atom, or —C(=O)—NH—, wherein, when $Ar_2$ is one of Formulae 1c to 1e, at least one of $R_5$ to $R_{16}$ is the first functional group and is —COOH, —OH, —CO—NH2, or —COH.

For example, in Formulae 1a to 1e, $R_1$ to $R_{16}$ may each independently be a hydrogen atom, a halogen atom, a hydroxyl group, —CH$_3$, or —CF$_3$, wherein, when $Ar_2$ is one of Formulae 1c to 1e, at least one of $R_5$ to $R_{16}$ is the first functional group and is —COOH, —OH, —CO—NH$_2$, or —COH; and $A_2$ and $A_3$ may each independently be a single bond, —O—, —CO—, —S—, —SO$_2$—, —C(CH$_3$)$_2$—, —CONH—, —C(CF$_3$)$_2$—, —CH$_2$—, or —CF$_2$—.

For example, polyamic acid may be represented by at least one of Formula 3 or Formula 4:

Formula 3

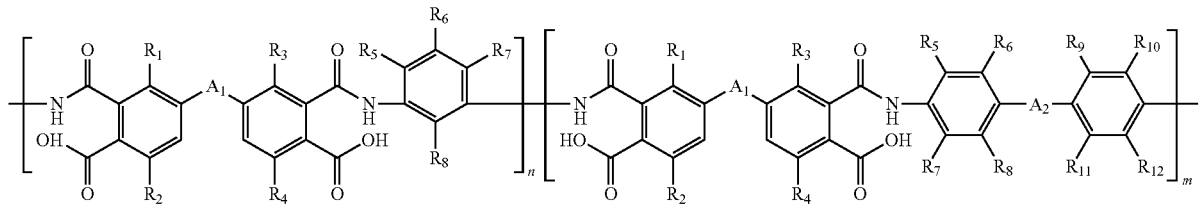

Formula 4

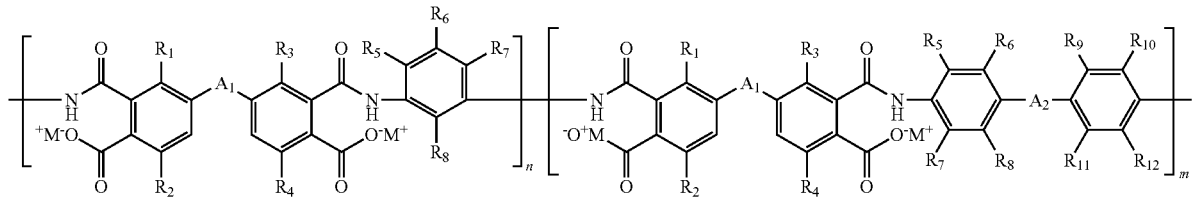

In Formulae 3 and 4, each M is the same or different, and is independently lithium or sodium; each $R_1$ to $R_{12}$ are the same or different, and are each independently hydrogen, a halogen atom, —COOH, —OH, —CO—NH$_2$, —COH, a C1-C10 alkyl group substituted or not substituted with a halogen atom, a C6-C20 aryl group substituted or not substituted with a halogen atom, or a C2-C20 heteroaryl group substituted or not substituted with a halogen atom, wherein at least one of $R_1$ to $R_{12}$ is a halogen group or a group substituted with a halogen group; $A_1$ and $A_2$ are each independently a single bond, —O—, —S—, —C(=O)—, —S(=O)$_2$—, —Si($R_a$)($R_b$)— wherein $R_a$ and $R_b$ are each independently a C1-C10 alkyl group, a C1-C10 alkylene group substituted or not substituted with a halogen atom, or —C(=O)—NH—, wherein at least one of $R_5$ to $R_6$ is —COOH, —OH, —CO—NH$_2$, or —COH; and n and m are each mole fractions in repeating units, wherein n and m in Formulae 3 and 4 each independently satisfy 0<n≤1, 0≤m<1, and n+m=1.

In an embodiment, the polyimide may be a compound represented by at least one of Formula 5 or Formula 6:

Formula 5

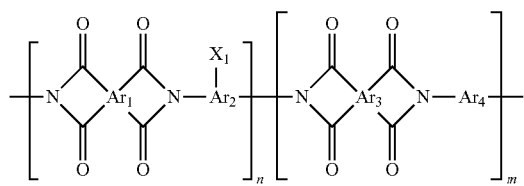

Formula 6

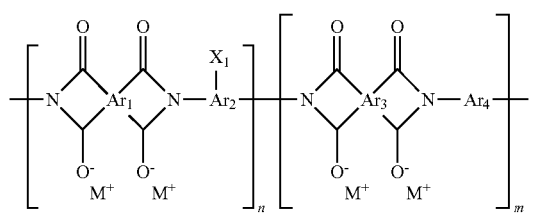

In Formulae 5 and 6, each M is the same or different, and is an alkali metal; each $Ar_1$ and $Ar_3$ are the same or different, and are each independently an aromatic group that is a substituted or unsubstituted tetravalent C6-C24 arylene group or a substituted or unsubstituted tetravalent C4-C24 heteroarylene group, and the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si($R_a$)($R_b$)— wherein $R_a$ and $R_b$ are each independently a C1-C10 alkyl group, a substituted or unsubstituted C1-C10 alkylene group, or —C(=O)—NH—; each $Ar_1$ and $Ar_4$ are the same or different, and are each independently at least one aromatic group that is a substituted or unsubstituted C6-C24 arylene group or a substituted or unsubstituted C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si($R_a$)($R_b$)—wherein $R_a$ and $R_b$ are each independently a C1-C10 alkyl group, a substituted or unsubstituted C1-C10 alkylene group, or —C(=O)—NH—; at least one of $Ar_1$ to $Ar_4$ is substituted by a halogen group; $X_1$ is a first functional group which is —COOH, —OH, —CO—NH$_2$, or —COH; and n and m are each mole fractions in repeating units, wherein n and m in Formulae 5 and 6 each independently satisfy 0<n≤1, 0≤m<1, and n+m=1.

The halogen group may be a halogen atom or a halogen-containing group. The halogen atom may be a fluorine atom, a chlorine atom, a bromine atom, or an iodine atom. For example, the halogen atom may be a fluorine atom.

Here, $Ar_1$ and $Ar_3$ may be each independently at least one of Formulae 1a and 1b, and $Ar_2$ and $Ar_4$ may be each independently at least one of Formula 1c to 1e.

In an embodiment, the polyimide may be a compound represented by at least one of Formula 7 or Formula 8:

Formula 7

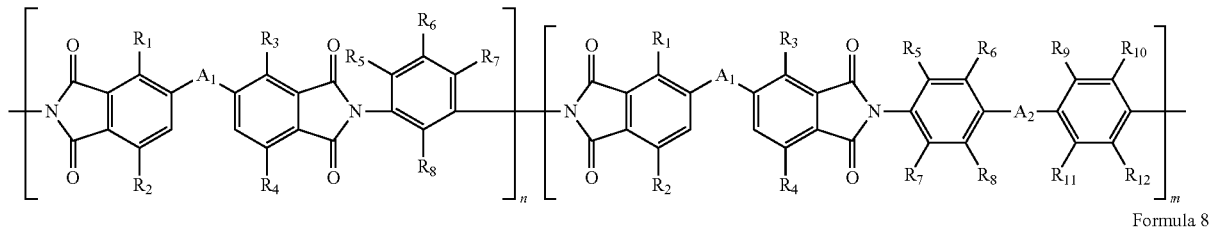

Formula 8

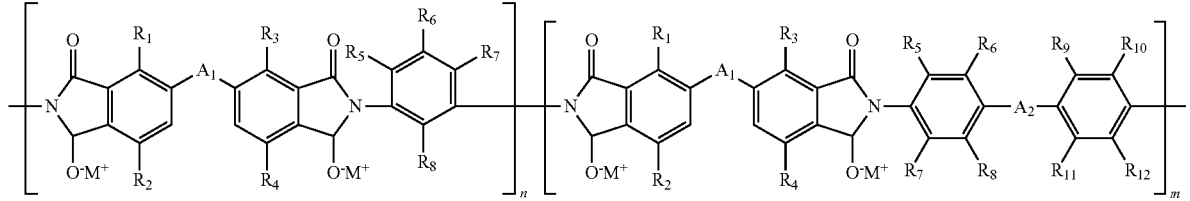

In Formulae 7 and 8, each M is the same or different, and is independently lithium or sodium; each $R_1$ to $R_{12}$ is the same or different, and are each independently hydrogen, a halogen atom, —COOH, —OH, —CO—NH$_2$, —COH, a C1-C10 alkyl group substituted or not substituted with a halogen atom, a C6-C20 aryl atom substituted or not substituted with a halogen atom, or a C2-C20 heteroaryl group substituted or not substituted with a halogen atom, wherein at least one of $R_1$ to $R_{12}$ is a halogen group or a group substituted with a halogen group; each $A_1$ and $A_2$ are the same or different, and are each independently a single bond, —O—, —S—, —C(=O)—, —S(=O)$_2$—, —Si($R_a$)($R_b$)— wherein $R_a$ and $R_b$ are each independently a C1-C10 alkyl group, a C1-C10 alkylene group substituted or not substituted with a halogen atom, or —C(=O)—NH—; wherein at least one of $R_5$ to $R_8$ is —COOH, —OH, —CO—NH$_2$, or —COH; and n and m are each mole fractions in repeating units, wherein n and m in Formula 7 and 8 each independently satisfy 0<n≤1, 0≤m<1, and n+m=1.

For example, the polyamic acid may be a compound represented by at least one of Formula 9 or Formula 10, and the polyimide may be a compound represented by at least one of Formula 11 or Formula 12:

Formula 9

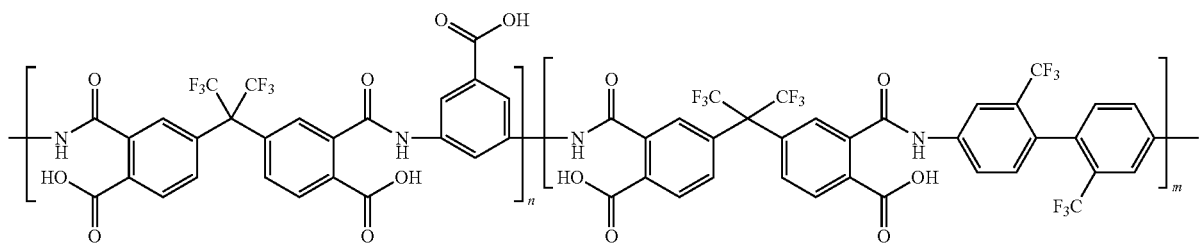

Formula 10

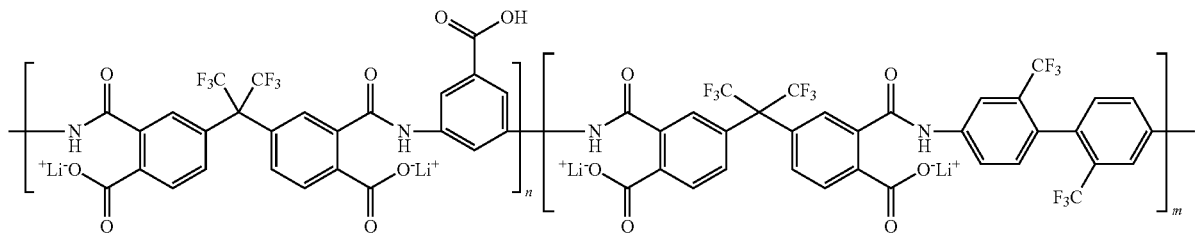

Formula 11

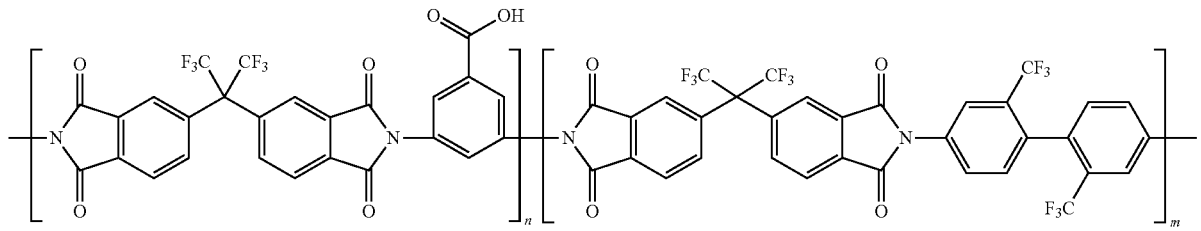

Formula 12

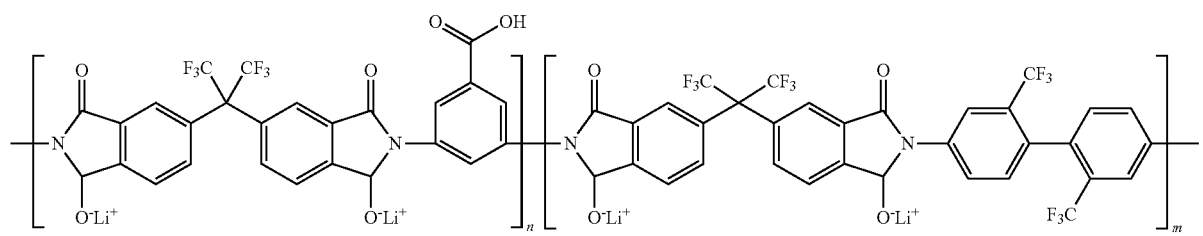

In each of Formulae 9 to 12, n and m are each mole fractions in repeating units, wherein n and m for Formulae 9 to 12 each independently satisfy 0<n≤1, 0≤m<1, and n+m=1.

For example, in the first polymer represented by Formulae 1 to 12, a mole fraction of repeating units including a cross-linking group and repeating units not including a cross-linking group may be n and m, respectively, which may each satisfy 0<n≤0.5, 0.5≤m<1, and n+m=1. For example, in the first polymer represented by Formulae 1 to 12, a mole fraction of repeating units including a cross-linking group and a mole fraction of repeating units not including a cross-linking group may be n and m, respectively, which may each satisfy 0.1≤n≤0.4, 0.6≤m≤0.9, and n+m=1. For example, in the first polymer represented by Formulae 1 to 12, a mole fraction of repeating units including a cross-linking group and a mole fraction of repeating units not including a cross-linking group may be n and m, respectively, which may each satisfy 0.15≤n≤0.35, 0.65≤m≤0.85, and n+m=1. For example, in the first polymer represented by Formulae 1 to 12, a mole fraction of repeating units including a cross-linking group and a mole fraction of repeating units not including a cross-linking group may be n and m, respectively, which may each satisfy 0.21≤n≤0.3, 0.7≤m≤0.8, and n+m=1. When the mole fractions of repeating units n and m are within these ranges, physical properties of the active material may improve.

For example, the first polymer represented by Formulae 1 to 12 may be a random copolymer. For example, the first polymer represented by Formulae 1 to 12 may be a block copolymer.

A weight average molecular weight of the first polymer may be in a range of about 10,000 Dalton to about 1,200,000 Dalton. For example, a weight average molecular weight of the first polymer may be in a range of about 10,000 Dalton to about 1,100,000 Dalton. For example, a weight average molecular weight of the first polymer may be in a range of about 10,000 Dalton to about 1,000,000 Dalton. For example, a weight average molecular weight of the first polymer may be in a range of about 10,000 Dalton to about 500,000 Dalton. For example, a weight average molecular weight of the first polymer may be in a range of about 100,000 Dalton to about 500,000 Dalton. For example, a weight average molecular weight of the first polymer may be in a range of about 100,000 Dalton to about 400,000 Dalton. For example, a weight average molecular weight of the first polymer may be in a range of about 100,000 Dalton to about 300,000 Dalton. When the weight average molecular weight of the first polymer is within these ranges, physical properties of the polymer layer may improve.

In the polymer layer, the second polymer may be a polymerization reaction product or its hydrolysate of at least one monomer that is a vinyl monomer, an acetate monomer, an alcohol monomer, an acryl monomer, a methacryl monomer, an acrylamide monomer, or a methacrylamide monomer. As used herein, an "acetate monomer" refers to a monomer having an acetate ester group.

For example, the second polymer may be a polymerization reaction product or its hydrolysate of at least one monomer that is vinyl acetate, vinyl alcohol, butyl (meth) acrylate, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylenegylcol (meth)acrylate, 2-hydroxypropylenegylcol (meth)acrylate, acrylic acid, methacrylic acid, 2-(meth)acryloyloxyacetic acid, 3-(meth)acryloyloxypropanoic acid, 4-(meth)acryloyloxybutanoic acid, itaconic acid, maleic acid, 2-isocyanatoethyl (meth)acrylate, 3-isocyanatopropyl (meth)acrylate, 4-isocyanatobutyl (meth) acrylate, (meth)acrylamide, ethylene di(meth)acrylate, diethyleneglycol (meth)acrylate, triethylenegylcol di(meth) acrylate, trimethylol propane tri(meth)acrylate, trimethylol propane triacrylate, 1,3-butanediol (meth)acrylate, 1,6-hexanediol di(meth)acrylate, allyl acrylate, or N-vinylcaprolactam.

Particularly, the second polymer may be polyvinyl alcohol (PVA). For example, polyvinyl alcohol may be a hydrolysate that is obtained by hydrolyzing polyvinyl acetate with a base such as an alkali hydroxide.

A saponification degree of polyvinyl alcohol may be in a range of about 60% to about 99%. For example, a saponification degree of polyvinyl alcohol may be in a range of about 70% to about 95%. For example, a saponification degree of polyvinyl alcohol may be in a range of about 80% to about 90%. For example, a saponification degree of polyvinyl alcohol may be in a range of about 85% to about 90%. When the saponification degree is within these ranges, physical properties of the polymer layer may improve.

A weight average molecular weight of polyvinyl alcohol may be in a range of about 10,000 Daltons to about 500,000 Daltons. For example, a weight average molecular weight of polyvinyl alcohol may be in a range of about 10,000 Daltons to about 400,000 Daltons. For example, a weight average molecular weight of polyvinyl alcohol may be in a range of about 10,000 Daltons to about 300,000 Daltons. For example, a weight average molecular weight of polyvinyl alcohol may be in a range of about 10,000 Daltons to about 200,000 Daltons. For example, a weight average molecular weight of polyvinyl alcohol may be in a range of about 50,000 Daltons to about 150,000 Daltons. For example, a weight average molecular weight of polyvinyl alcohol may be in a range of about 70,000 Daltons to about 100,000 Daltons. For example, a weight average molecular weight of polyvinyl alcohol may be in a range of about 80,000 Daltons to about 100,000 Daltons. When the weight average molecular weight of polyvinyl alcohol is within these ranges, physical properties of the polymer layer may improve.

In the polymer layer, a weight ratio of the first polymer and the second polymer included in the third polymer may be in a range of about 1:99 to about 50:50. For example, a weight ratio of the first polymer and the second polymer included in the third polymer may be in a range of about 5:95 to about 45:55. For example, a weight ratio of the first polymer and the second polymer included in the third polymer may be in a range of about 5:95 to about 40:60. For example, a weight ratio of the first polymer and the second polymer included in the third polymer may be in a range of about 5:95 to about 35:65. For example, a weight ratio of the first polymer and the second polymer included in the third polymer may be in a range of about 10:90 to about 30:70. When the weight ratio of the first polymer to the second polymer is within these ranges, physical properties of the polymer layer may improve.

The cross-linking reaction between the first polymer and the second polymer to form the third polymer of the polymer layer may be performed at a temperature of about 160° C. or greater. For example, the cross-linking reaction of the polymer layer may be performed by heat-treating a composition including the first polymer and the second polymer at a temperature of about 160° C. or greater. For example, the cross-linking reaction of the polymer layer may be performed by heat-treating a composition including the first polymer and the second polymer at a temperature of about 165° C. or greater. For example, the cross-linking reaction of the polymer layer may be performed by heat-treating a composition including the first polymer and the second polymer at a temperature of about 170° C. or greater. For example, the cross-linking reaction of the polymer layer may be performed by heat-treating a composition including the first polymer and the second polymer at a temperature of about 175° C. or greater. A cross-linked polymer may be produced when the cross-linking reaction is performed at a temperature within these ranges. When the cross-linking reaction is performed at a temperature less than about 160° C., a cross-linked polymer product may not be produced. When the cross-linking reaction is performed at a temperature about 160° C. or greater, the cross-linking reaction may be a catalyst-free reaction. When a catalyst such as an acid catalyst is additionally included in the cross-linking reaction, a suitable temperature for the cross-linking reaction may be lowered from about 160° C. to about 120° C. Also, when a separate cross-linking agent is added in the cross-linking reaction, a suitable temperature for the cross-linking reaction may be about 120° C. or less.

Further, when the cross-linking reaction is performed at a temperature of about 160° C. or greater, polyamic acid may be cured to obtain a polyimide. For example, polyamic acid may provide an imidification ratio of about 60% or greater at a cross-linking reaction temperature of about 160° C. or greater. For example, polyamic acid may provide an imidification ratio of about 70% or greater at a cross-linking reaction temperature of about 160° C. or greater. For example, polyamic acid may provide an imidification ratio of about 80% or greater at a cross-linking reaction temperature of about 160° C. or greater. For example, polyamic acid may provide an imidification ratio of about 90% or greater at a cross-linking reaction temperature of about 160° C. or greater. An imidification ratio of polyamic acid may be calculated by using proton nuclear magnetic resonance ('H-NMR) spectroscopy. When polyamic acid is cured into a polyimide, mechanical properties of the polymer layer may improve.

In an embodiment, an acid equivalent of polyamic acid may be less than about 300 grams per equivalent (g/eq). For example, an acid equivalent of polyamic acid may be in a range of about 50 g/eq to about 250 g/eq. When the acid equivalent of polyamic acid is less than about 300 g/eq, an amount of carboxyl group (—C(=O)OH) and/or carboxylate group (—C(=O)O—) per unit weight may increase. When the amount of carboxyl group and/or carboxylate group per unit weight increases, for example, when a silicon negative active material is used as a negative electrode material, an interaction between the negative active material having a hydroxyl group on a surface thereof and the polymer layer may increase, which may result improving a bonding strength of the polymer layer to the negative active material. When the acid equivalent is about 300 g/eq or greater, initial efficiency and lifetime characteristics of the lithium secondary battery may deteriorate.

A modulus of the third polymer of the polymer layer may have a value that is greater than each of a modulus of the first polymer and a modulus of the second polymer. Since the third polymer is a cross-linked polymer that is formed by a cross-linking reaction of the first polymer and the second polymer, a stiffness of the third polymer may increase as a modulus of the third polymer increases. For example, a modulus of the third polymer may be about 30 gigapascal (GPa) or greater. For example, a modulus of the third polymer may be about 35 GPa or greater. For example, a modulus of the third polymer may be about 38 GPa or greater. The modulus may be an indentation modulus. The modulus of the third polymer can be measured with a microindenter by applying a force on the third polymer and measuring displacement.

An indentation hardness of the third polymer may be greater than each of an indentation hardness of the first polymer and an indentation hardness of the second polymer. For example, since the third polymer is a cross-linked polymer that is formed by cross-linking reaction of the first polymer and the second polymer, a surface indentation hardness of the third polymer may increase. For example, an indentation hardness of the third polymer may be about 1630 newtons per square millimeter (N/mm$^2$) or greater. For example, an indentation hardness of the third polymer may be about 1700 N/mm$^2$ or greater. For example, an indentation hardness of the third polymer may be about 1800 N/mm$^2$ or greater. For example, an indentation hardness of the third polymer may be about 1900 N/mm$^2$ or greater. For example, an indentation hardness of the third polymer may be about 2000 N/mm$^2$ or greater. For example, an indentation hardness of the third polymer may be about 2100 N/mm$^2$ or greater. For example, an indentation hardness of the third polymer may be about 2200 N/mm$^2$ or greater.

The third polymer, which is a cross-linked polymer, may have a 3-dimensional network structure including a plurality of first polymer chains and a plurality of second polymer chains that are cross-linked to each other by a linker or a cross-linker. When the third polymer has this network structure, the volume change of the active material core coated with the polymer layer during charging/discharging may be reduced, for example suppressed.

A weight average molecular weight of the third polymer may be in a range of about 10,000 Daltons to about 1,500,000 Daltons. For example, a weight average molecular weight of the third polymer may be in a range of about 10,000 Daltons to about 1,200,000 Daltons. For example, a weight average molecular weight of the third polymer may be in a range of about 10,000 Daltons to about 1,100,000

Daltons. For example, a weight average molecular weight of the third polymer may be in a range of about 10,000 Daltons to about 1,000,000 Daltons. For example, a weight average molecular weight of the third polymer may be in a range of about 10,000 Daltons to about 500,000 Daltons. For example, a weight average molecular weight of the third polymer may be in a range of about 100,000 Daltons to about 500,000 Daltons. For example, a weight average molecular weight of the third polymer may be in a range of about 100,000 Daltons to about 400,000 Daltons. For example, a weight average molecular weight of the third polymer may be in a range of about 100,000 Daltons to about 300,000 Daltons. When the weight average molecular weight of the third polymer is within these ranges, physical properties of the polymer layer may improve.

For example, the third polymer may be a compound represented by at least one of Formulae 13 to 16:

Formula 13

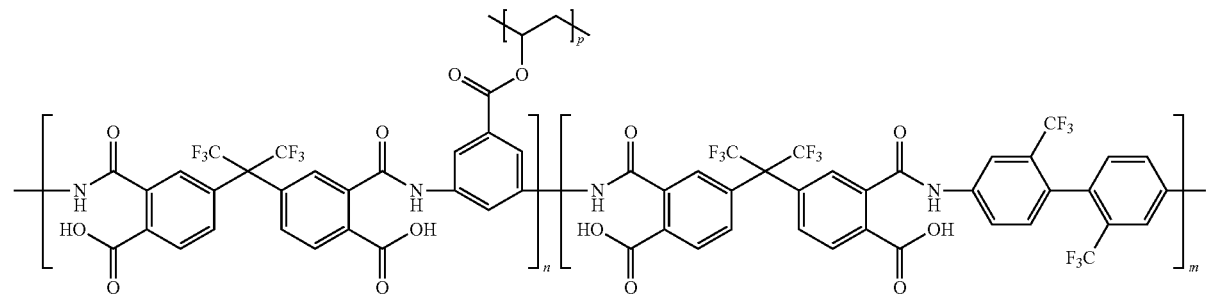

Formula 14

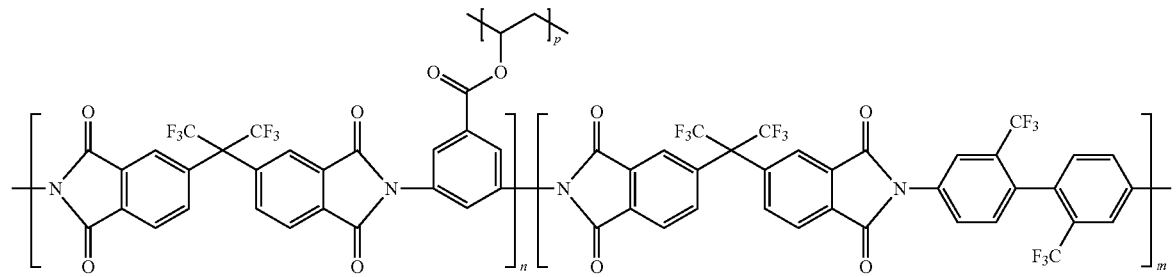

Formula 15

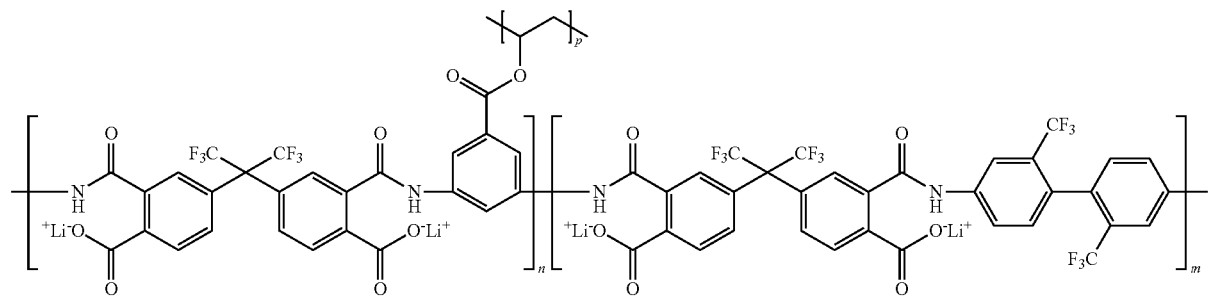

Formula 16

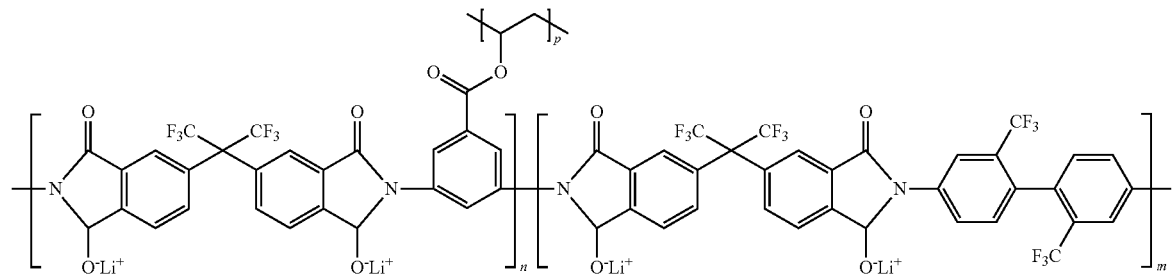

In each of Formulae 13 to 16, n and m are each mole fractions of repeating units, wherein n and m for Formulae 13 to 16 each independent satisfy 0<n≤1, 0≤m<1, and n+m=1, and p is a degree of polymerization which may be in a range of about 250 to about 12500.

In an embodiment, the negative active material further includes a third functional group that is at least one of a carboxyl group or a hydroxyl group on a surface of the active material core, and the third functional group reacts with the first functional group or the second functional group to form an ester bond, which results in cross-linking of the active material core and the third polymer. When the active material core and the polymer layer are cross-linked by an ester bond between the active material core and the third polymer in the polymer layer, an electrode including the negative active material is stabilized and may lead to an increase of the number of charging/discharging cycles of a lithium secondary battery, and thus lifetime characteristics of the lithium secondary battery may improve.

An amount of the polymer layer may be in a range of about 0.01 parts to about 10 parts by weight based on 100 parts by weight of the active material core. For example, an amount of the polymer layer may be in a range of about 0.1 parts to about 7 parts by weight based on 100 parts by weight of the active material core. For example, an amount of the polymer layer may be in a range of about 1 part to about 5 parts by weight based on 100 parts by weight of the active material core. When the amount of the polymer layer is within these ranges, structural stability of the active material core and suppression of side reactions of the surface of the active material may be improved.

An average particle diameter (D50) of the negative active material may be in a range of about 200 nanometers (nm) to about 50 micrometers (μm), for example, about 1 μm to about 30 μm, about 1 μm to about 10 μm, or, about 3 μm to about 5 μm.

Also, the active material core that does not include the polymer layer disposed on a surface thereof has a specific surface area that is greater than about 15 meters squared per gram ($m^2/g$) due to its porous structure, whereas a specific surface area of the negative active material may be about 15 $m^2/g$ or less when the polymer layer is dispose thereon. For example, a specific surface area of the negative active material may be in a range of about 1 $m^2/g$ to about 15 $m^2/g$. When an amount of the polymer layer increases, a specific surface area of the negative active material may decrease.

According to another embodiment, a lithium secondary battery includes a negative electrode including the negative active material; a positive electrode facing the negative electrode; and an electrolyte between the negative electrode and the positive electrode.

The negative electrode includes the negative active material. In an embodiment, the negative active material, a binder, and, optionally, a conducting agent are mixed in a solvent to prepare a negative active material composition. In another embodiment, the negative active material composition may be molded into a predetermined shape or may be coated on a current collector, such as a copper foil, to prepare the negative electrode.

The negative electrode may further include an additional negative active material that is generally used as a negative active material of a lithium battery in the art. The negative active material may include at least one of lithium metal, a metal or semimetal that is alloyable with lithium, a transition metal oxide, a non-transition metal oxide, or a carbonaceous material.

Examples of the metal or semimetal alloyable with lithium are Si, Sn, Al, Ge, Pb, Bi, Sb, a Si—Y' alloy (where Y' is an alkali metal, an alkali earth metal, a Group XIII element, a Group XIV element, a transition metal, a rare earth element, or a combination thereof, and Y' is not Si), and a Sn—Y' alloy (where Y' is an alkali metal, an alkali earth metal, a Group XIII element, a Group XIV element, a transition metal, a rare earth element, or a combination thereof, and Y' is not Sn). In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

Examples of the transition metal oxide include a lithium titanium oxide, a vanadium oxide, and a lithium vanadium oxide.

Examples of the non-transition metal oxide include $SnO_2$ and $SiO_x$ (where 0<x<2).

Examples of the carbonaceous material are crystalline carbon, amorphous carbon, and mixtures thereof. An example of the crystalline carbon is graphite, such as natural graphite or artificial graphite, in shapeless, plate, flake, spherical, or fibrous form. Examples of the amorphous carbon are soft carbon (carbon sintered at low temperatures), hard carbon, meso-phase pitch carbonization products, and sintered cokes.

When the negative active material according to an embodiment and a carbonaceous material are used together, an oxidation of a silicon active material may be suppressed, and a solid electrolyte interface (SEI) layer may be effectively formed. Accordingly, a stable layer may be formed, and an electric conductivity may improve, which may thus improve charging/discharging characteristics of lithium battery.

The additional negative active material may be mixed and blended with the negative active material, may be coated on a surface of a particle of the negative active material, or may be used as a combination.

The binder included in the negative active material composition contributes in binding of the negative active material and the conducting agent and binding of the negative active material to the current collector, and an amount of the binder may be in a range of about 1 part to about 50 parts by weight based on 100 parts by weight of the negative active material. For example, an amount of the binder may be in a range of about 1 part to about 30 parts by weight, for example, about 1 part to about 20 parts by weight, or about 1 part to about 15 parts by weight, based on 100 parts by weight of the negative active material. Examples of the binder may include various polymers such as polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, polyethylene, polypropylene, polystyrene, polymethyl methacrylate, polyaniline, acrylonitrile butadiene styrene copolymer, phenol resin, epoxy resin, polyethylene terephthalate, polytetrafluoroethylene, polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluorine rubber, or a combination thereof.

The negative electrode may optionally include a conducting agent to increase an electrical conductivity by providing a conduction pathway to the negative active material. The conducting agent may be any suitable material, including those in the art that are used in a lithium battery. Examples of the conducting agent may include a carbonaceous material such as carbon black, acetylene black, Ketjen black, or carbon fiber (e.g., vapor grown carbon fiber); a metallic material such as a metal powder or metal fibers of copper, nickel, aluminum, or silver; a conductive polymer such as a polyphenylene or a derivative thereof; or a conducting material including a mixture thereof. An amount of the conducting agent may be appropriately controlled. For example, a weight ratio of the negative active material and the conducting agent may be in a range of about 99:1 to about 90:10.

Examples of the solvent may include N-methylpyrrolidone (NMP), acetone, and water. An amount of the solvent may be in a range of about 1 part to about 100 parts by weight based on 100 parts by weight of the negative active material. When the amount of the solvent is within this range, an active material layer may be easily formed.

Also, a thickness of the current collector may be in a range of about 3 μm to about 500 μm, and may be any of various suitable current collectors that do not cause a chemical change to a battery and that have high conductivity. Examples of the current collector for a negative electrode may include copper, stainless steel, aluminum, nickel, titanium, calcined carbon, and copper and stainless steel that are surface-treated with carbon, nickel, titanium, or silver. The current collector for a negative electrode may have an uneven microstructure at its surface to enhance a binding force with the negative active material. Also, the current collector may be used in various forms including as a film, a sheet, a foil, a net, a porous body, a foaming body, and a non-woven body.

The negative active material composition may be directly coated on a current collector, or the negative active material composition may be cast on a separate support to form a negative active material film, which may then be separated from the support and laminated on a copper foil current collector to prepare a negative electrode plate, but embodiments to prepare the negative electrode are not limited thereto.

The negative active material composition may be printed on a flexible electrode substrate to manufacture a printable battery, in addition to the use in manufacturing a lithium secondary battery.

Separately, for the manufacture of a positive electrode, a positive active material composition may be prepared, for example, by mixing a positive active material, a binder, a solvent, and, optionally, a conducting agent.

The positive active material may be a lithium-containing metal oxide, and any suitable material, including those available as a positive active material in the art, may be used.

For example, the positive active material may be a compound represented by one of the following formulae: $Li_aA_{1-b}B'_bD'_2$ (where $0.90 \le a \le 1.8$ and $0 \le b \le 0.5$); $Li_aE_{1-b}E'_bO_{2-c}D'_c$ (where $0.90 \le a \le 1.8$, $0 \le b \le 0.5$, and $0 \le c \le 0.05$); $Li E_{2-b}B'_bO_{4-c}D'_c$ (where $0 \le b \le 0.5$ and $0 \le c \le 0.05$); $Li_aNi_{1-b-c}Co_bB'_cD'_\alpha$ (where $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_2$ (where $0.90 \le a \le 1.8$, $0 \le b \le 0.5$, $0 \le c \le 0.05$, and $0 < \alpha < 2$); $Li_aNi_{1-b-c}Mn_bB'_cD'_\alpha$ (where $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1.8$, $0 \le b \le 0.5$, $0 \le c \le 0.05$, and $0 < \alpha < 2$); $Li_aNi_bE_cG'_dO_2$ (where $0.90 \le a \le 1.8$, $0 \le b \le 0.9$, $0 \le c \le 0.5$, and $0.001 \le d \le 0.1$); $Li_aNi_bCo_cMn_dG'_eO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG'_bO_2$ (where $0.90 \le a \le 1.8$ and $0.001 \le b \le 0.1$); $Li_aCoG'_bO_2$ (where $0.90 \le a \le 1.8$ and $0.001 \le b \le 0.1$); $Li_aMnG'_bO_2$ (where $0.90 \le a \le 1.8$ and $0.001 \le b \le 0.1$); $Li_aMn_2G'_bO_4$ (where $0.90 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G' may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

The compounds listed above as cathode active materials may have a surface coating layer (hereinafter, also referred to as "coating layer"). Alternatively, a mixture of a compound without a coating layer and a compound having a coating layer, the compounds being selected from the compounds listed above, may be used. In an embodiment, the coating layer may include at least one compound of a coating element selected from an oxide, a hydroxide, an oxyhydroxide, an oxycarbonate, and a hydroxycarbonate of the coating element. In an embodiment, the compounds for the coating layer may be amorphous or crystalline. In another embodiment, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In an embodiment, the coating layer may be formed using any suitable method that does not adversely affect the physical properties of the positive active material when a compound of the coating element is used. For example, the coating layer may be formed using a spray coating method or a dipping method. The coating methods may be well understood by one of ordinary skill in the art, and thus a detailed description thereof will be omitted.

In an embodiment, the positive active material may be $LiNiO_2$, $LiCoO_2$, $LiMn_xO_{2x}$ (wherein $x=1$ or 2), $LiNi_{1-x}Mn_xO_2$ (where $0<x<1$), $LiNi_{1-x-y}Co_xMn_yO_2$ (wherein $0 \le x \le 0.5$ and $0 \le y \le 0.5$), $LiFeO_2$, $V_2O_5$, TiS, or MoS.

The conductive agent, the binder, and the solvent included in preparing the positive active material composition may be the same as those included in the negative active material composition. In an embodiment, a plasticizer may be further added to the negative active material composition and to the positive active material composition in order to form pores in a corresponding electrode plate. Amounts of the positive active material, the conducting agent, the binder, and the solvent may be at the same levels used in a conventional lithium battery.

A positive electrode current collector may have a thickness of about 3 µm to about 500 µm, and may be any of various suitable current collectors that do not cause a chemical change to a battery and that has high conductivity. Examples of the current collector for a positive electrode may include stainless steel, aluminum, nickel, titanium, calcined carbon, and aluminum and stainless steel that are surface-treated with carbon, nickel, titanium, or silver. The current collector for a positive electrode may have an uneven microstructure at its surface to enhance a binding force with the positive active material. Also, the current collector may be used in various forms including as a film, a sheet, a foil, a net, a porous body, a foaming body, a non-woven body.

The positive active material composition thus prepared may be directly coated on the current collector for a positive electrode to form a positive electrode plate, or may be cast onto a separate support and a positive active material film separated from the support is laminated on the current collector for a positive electrode.

The positive electrode and the negative electrode may be separated by a separator, and the separator may be any of various suitable separators, including those that are used in the art for a lithium battery. In particular, the separator may include a material that has a low resistance to migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be non-woven or woven. The separator may have a pore diameter in a range of about 0.01 µm to about 10 µm, and a thickness in a range of about 5 µm to about 300 µm.

A lithium salt-containing non-aqueous based electrolyte solution includes a non-aqueous electrolyte and a lithium salt. Examples of the non-aqueous electrolyte may include a non-aqueous electrolyte solvent, a solid electrolyte, and an inorganic solid electrolyte.

The non-aqueous electrolyte solvent may be an aprotic organic solvent, and examples of the aprotic organic solvent may include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte may include nitrides, halides, and sulfates of lithium such as $Li_3N$, $LiI$, $Li_5NI_2$, $Li_3N$—$LiI$—$LiOH$, and $Li_4SiO_4$—$LiI$—$LiOH$; $Li_2SiS_3$, $Li_4SiO_4$; and $Li_3PO_4$—$Li_2S$—$SiS_2$.

The lithium salt may be any suitable lithium salt, including those used in the art for a lithium battery, with the proviso that it is soluble in the lithium salt-containing non-aqueous electrolyte. For example, the lithium salt may include at least one of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlC_{14}$, $CH_3SO_3Li$, $CF_3SO_3Li$, $(CF_3SO_2)_2NLi$, lithium chloroborate, lower aliphatic carboxylate lithium, lithium tetraphenyl borate, or lithium imide.

Lithium secondary batteries may be classified as lithium ion batteries, lithium ion polymer batteries, and lithium polymer batteries according to the types of a separator and an electrolyte used therein. In addition, lithium batteries may be classified as a cylindrical type, a rectangular type, a coin type, and a pouch type according to a battery shape, and may also be classified as a bulk type and a thin type according to a battery size.

A method of manufacturing a lithium battery is widely known in the art, and thus detailed description thereof will not be provided herein.

Figure 3:
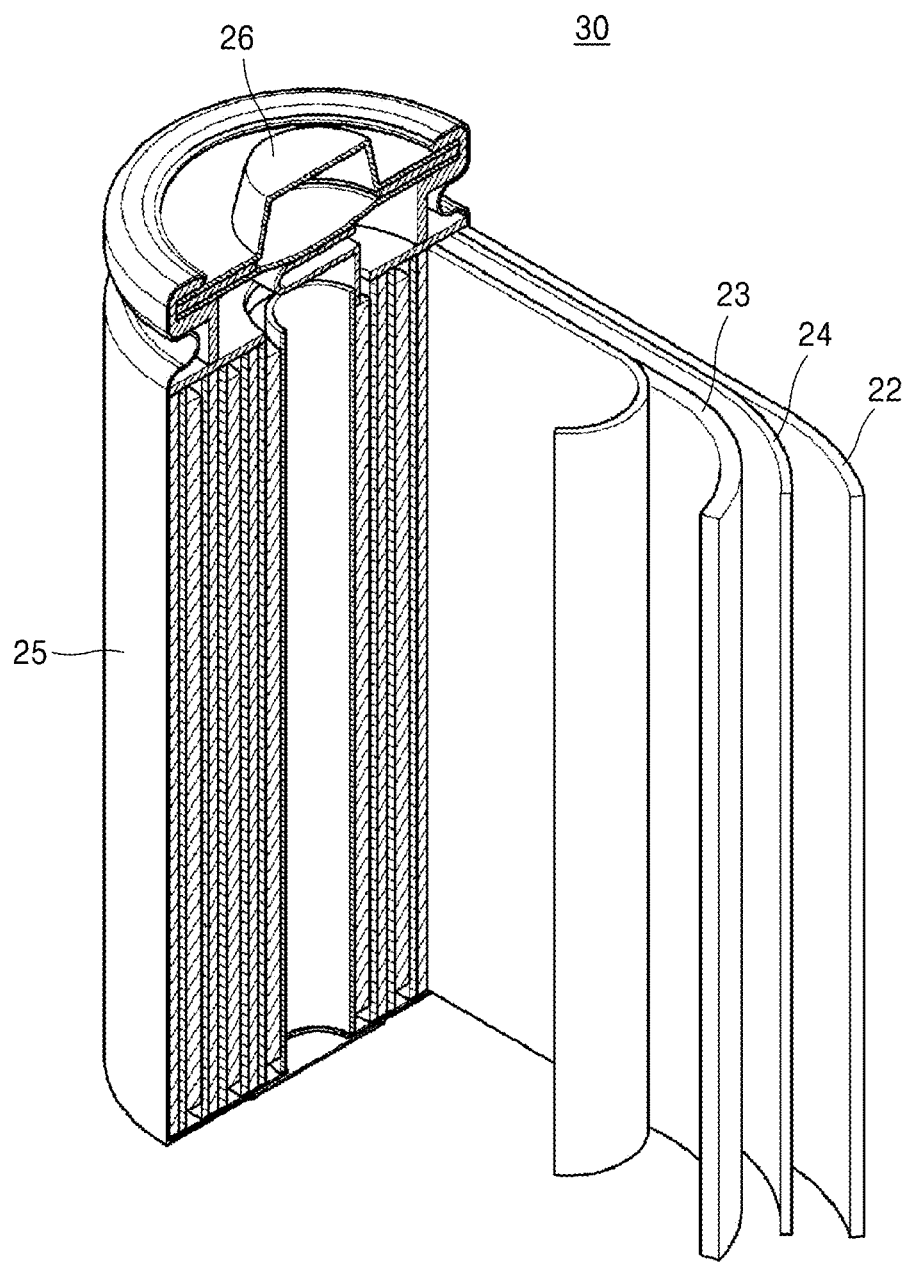
FIG. 3 is a cross-sectional view that schematically illustrates a structure of a lithium secondary battery according to an embodiment.

FIG. 3 is a schematic diagram illustrating a structure of a lithium secondary battery according to an exemplary embodiment.

Referring to FIG. 3, in an embodiment the lithium secondary battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Subsequently, an electrolyte is injected into the battery case 25, and the battery case 25 is sealed by a sealing member 26, thereby completing the manufacture of the lithium secondary battery 30. The battery case 25 may have a cylindrical shape, a rectangular shape, or a thin-film shape. The lithium battery 30 may be a lithium ion battery.

The lithium secondary battery may be suitable to be used as a battery, as a power source of small-sized devices such as mobile phones or portable computers, or as a unit battery of a battery module including a plurality of batteries in medium-to-large-sized devices.

Examples of the medium-to-large-sized devices may include a power tool; an xEV such as electric vehicle (EV), hybrid electric vehicle (HEV), and plug-in hybrid electric vehicle (PHEV); electric bicycles such as E-bike or E-scooter; an electric golf cart; an electric truck; an electric commercial vehicle; or an electric power storage system, but embodiments are not limited thereto. Also, the lithium battery may be suitable for use requiring a high output, a high voltage, and high temperature operability.

Hereinafter, a method of manufacturing the negative active material will be described.

According to another embodiment, a method of manufacturing the negative active material includes mixing a first composition and a second composition to prepare a third composition, wherein the first composition includes a first polymer that is at least one of polyamic acid, polyimide, or a combination thereof, and having a first functional group; and a non-aqueous solvent, and the second composition includes a water-soluble second polymer having a second functional group; and water; wherein at least one of the first polymer and the second polymer further includes a halogen group; and contacting a surface of the active material core with the third composition to form a coated surface; and heat-treating the coated surface at a temperature of about 160° C. or greater to form a polymer layer including a third polymer on the surface of the active material core, wherein the third polymer is a cross-linked product of a first polymer and a second polymer, and the first polymer and the second polymer are cross-linked by an ester bond that is formed by a reaction of the first functional group and the second functional group.

The first polymer, the second polymer, and the third polymer may be the same as those described herein in relation to the negative active material. A nonaqueous solvent in the first composition may be a polar solvent such as NMP or alcohol. The first composition may further include water. Although the second composition is an aqueous solution including water, the second composition may further include a polar organic solvent that may be mixed with water, such as alcohol, in addition to water. Therefore, the first composition and the second composition may be easily mixed.

Subsequently, a surface of the active material core may be contacted or treated with the third composition, and the resulting coated surface including the third composition may be heat-treated at a temperature of about 160° C. or greater to form a polymer layer including a third polymer on the surface of the active material core, wherein the third polymer is a cross-linked product of a first polymer and a second polymer, and the first polymer and the second polymer are cross-linked by an ester bond that is formed by a reaction of the first functional group and the second functional group.

Although a period of time for heat-treating the coated surface including the third composition at a temperature of about 160° C. or greater is not limited, the heat-treating of the third composition may be performed at a temperature of about 160° C. or greater for about 1 hour to about 10 hours. For example, the heat-treating of the third composition may be performed at a temperature of about 160° C. or greater for about 1 hour to about 5 hours. For example, the heat-treating of the third composition may be performed at a temperature of about 160° C. or greater for about 1 hour to about 3 hours. When the heat-treating time is too short, a cross-linking bond may not be sufficiently formed, and when the heat-treating time is too long, a difference in degrees of cross-linking compared to the heat-treating time may be insignificant. When a cross-linking catalyst such as an acid catalyst is added to the third composition prior to the heat-treating process, the heat-treating temperature may be lowered from about 160° C. to about 120° C. or greater , and when a separate cross-linking agent is further added, the heat-treating temperature may be further lowered. However, when the heat-treating temperature is too low, polyamic acid may not be cured to polyimide.

In the method of manufacturing the negative active material, the first polymer may include an alkali metal. The first polymer may be substituted or doped (i.e., coordinated) with an alkali metal. Details about the first polymer substituted or doped with an alkali metal may be referred to the description in relation to the negative active material.

Hereinafter are definitions of substituents used in the specification.

As used herein, a substituent may be derived by substitution of at least one hydrogen atom in a group with another atom or functional group. Unless stated otherwise, a "substituted" functional group refers to a functional group substituted with at least one substituent selected from a C1-C40 alkyl group, a C2-C40 alkenyl group, a C3-C40 cycloalkyl group, a C3-C40 cycloalkenyl group, a C6-C40 aryl group, C7-C40 alkylaryl group, and a C7-C40 arylalkyl group. When a functional group is "optionally substituted", it means that the functional group may be substituted with such a substituent as listed above.

As used herein, in the expressions regarding the number of carbons, i.e., a capital "C" followed by a number, for example, "C1-C20", "C3-C20", or the like, the number such as "1", "3", or "20" following "C" indicates the number of carbons in a particular functional group. That is, a functional group may include from 1 to 20 carbon atoms. For example, a "C1-C4 alkyl group" refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

As used herein, a particular radical may refer to a monovalent radical or a divalent radical depending on the context. For example, when a substituent needs two binding sites for binding with the rest of the molecule, the substituent may be understood as a divalent radical. For example, a substituent specified as an alkyl group that needs two binding sites may be a divalent radical, such as —$CH_2$—, —$CH_2CH_2$—, or —$CH_2CH(CH_3)CH_2$—. The term "alkylene" clearly indicates that the radical is a divalent radical.

As used herein, the terms "alkyl group", and "alkylene group" used in the formulae refers to a branched or unbranched aliphatic hydrocarbon group. For example, the alkyl group may or may not be substituted. Non-limiting examples of the alkyl group are a methyl group, an ethyl group, a propyl group, an isopropyl group, a butyl group, an isobutyl group, a tert-butyl group, a pentyl group, and a hexyl group, each of which may be optionally substituted or not. In some embodiments, the alkyl group may have 1 to 6 carbon atoms. For example, a C1-C6 alkyl group may be a methyl group, an ethyl group, a propyl group, an isopropyl group, a butyl group, an iso-butyl group, a sec-butyl group, a pentyl group, a 3-pentyl group, or a hexyl group, but is not limited thereto.

As used herein, the term "alkylene group" used in formulae refers to a divalent alkyl group.

As used herein, the term "alkenyl group" refers to a hydrocarbon group including 2 to 20 carbon atoms with at least one carbon-carbon double bond. Non-limiting examples of the alkenyl group are an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cycloheptenyl group. For example, these alkenyl groups may be substituted or not. For example, a substituted alkenyl group may have 2 to 40 carbon atoms.

As used herein, the term "alkynyl group" refers to a hydrocarbon group including 2 to 20 carbon atoms with at least one carbon-carbon triple bond. Non-limiting examples of the alkynyl group are an ethynyl group, a 1-propynyl group, a 1-butynyl group, and a 2-butynyl group. For examples, these alkynyl groups may be substituted or not. For example, a substituted alkynyl group may have 2 to 40 carbon atoms.

As used herein, the term "cycloalkyl group" refers to a cyclic alkyl having one or more carbocyclic rings or a ring system that is fully saturated. For example, the "cycloalkyl group" may refer to a cyclopropyl group, a cyclobutyl group, a cyclopentyl group, or a cyclohexyl group. The term "cycloalkylene" refers to a divalent cycloalkyl group.

As used herein, the term "aromatic" refers to a ring or ring system with a conjugated n electron system, and may refer to a carbocyclic aromatic group (for example, a phenyl group) and a heterocyclic aromatic group (for example, a pyridine group). For example, if the whole ring system is aromatic, the term includes a monocyclic ring or a fused polycyclic ring (i.e., a ring that shares adjacent atom pairs).

As used herein, the term "aryl group" refers to an aromatic ring in which a ring skeleton includes only carbon atoms, a ring system (i.e., two or more fused rings sharing two or more adjacent carbon atoms), or a plurality of aromatic rings linked to each other by a single bond, —O—, —S—, —C(=O)—, —S(=O)$_2$—, —Si(R$_a$)(R$_b$)— wherein R$_a$ and R$_b$ are each independently a C1-C10 alkyl group, a C1-C10 alkylene group substituted or not substituted with a halogen atom, or —C(=O)—NH—. When the aryl group is a ring system, each ring in the ring system is aromatic. Non-limiting examples of the aryl group are a phenyl group, a biphenyl group, a naphthyl group, a phenanthrenyl group, and a naphthacenyl group. These aryl groups may or may not be substituted.

As used herein, the term "arylene group" refers to an aryl group that requires at least two connection points (bonding sites). A tetravalent arylene group is an aryl group that requires at least four connection points, and a divalent arylene group is an aryl group that requires two connection points. Non-limiting examples of the arylene group is —C$_6$H$_5$—O—C$_6$H$_5$—.

As used herein, the term "heteroaryl group" refers to an aromatic ring system with one ring, a plurality of fused rings, or to a plurality of rings linked to each other by a single bond, —O—, —S—, —C(=O)—, —S(=O)$_2$—, —Si(R$_a$)(R$_b$)— where R$_a$ and R$_b$ are each independently a C1-C10 alkyl group, a C1-C10 alkylene group substituted or not substituted with a halogen atom, or —C(=O)—NH—, in which at least one member of a ring is a heteroatom, i.e., not carbon. In the fused ring system, at least one heteroatom may be included in one ring. For example, the heteroatom may be oxygen, sulfur, or nitrogen, but is not limited thereto. The heteroaryl group may include, for example, 1 to 5 heteroatoms, and in an embodiment, may include a five- to ten-membered ring. Non-limiting examples of the heteroaryl group are a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

As used herein, the term "heteroarylene group" refers to a heteroaryl group that requires at least two connection points. A tetravalent heteroarylene group is a heteroaryl group that requires at least four connection points, and a divalent heteroarylene group is a heteroaryl group that requires two connection points.

As used herein, the term "arylalkyl group" refers to an aryl group linked to a substituent via an alkylene group, like a C7-C14 arylalkyl group. Non-limiting examples of the arylalkyl group are a benzyl group, a 2-phenylethyl group, a 3-phenylpropyl group, and a naphthylalkyl group. For example, the alkylene group may be a lower alkylene group (i.e., a C1-C4 alkylene group).

As used herein, the term "alkylaryl" refers to alkyl group linked to a substituent via an arylene group.

As used herein, the terms "cycloalkenyl group" refers to a non-aromatic carbocyclic ring or ring system with at least one double bond. For example, the cycloalkenyl group may be a cyclohexenyl group.

As used herein, the terms "heterocyclic group" refers to a non-aromatic ring or ring system including at least one heteroatom instead of carbon in its cyclic backbone.

As used herein, the term "halogen atom" refers to a stable atom belonging to Group 17 of the periodic tables of elements, for example, fluorine atom, chlorine atom, bromine atom, or iodine atom. For example, the halogen atom may be fluorine atom and/or chlorine atom.

Weight average molecular weight of the first polymer to the third polymer are measured by using gel permeation chromatography (GPC) based on a polystyrene standard sample.

Hereinafter, one or more exemplary embodiments will be described in detail with reference to the following examples. However, these examples are not intended to limit the scope of the one or more embodiments of the present disclosure.

EXAMPLES

Example 1

(1) Preparation of Negative Active Material
A) Preparation of Active Material Core Silicon particles dispersed in an alcohol solution were pulverized through a milling process and spray-dried to prepare silicon agglomerate particles having a size of about 5 μm. The silicon agglomerate particles thus prepared were heat-treated at a temperature of about 1000° C. under a methane gas atmosphere to synthesize a silicon carbon composite covered with about 37 weight percent (wt %) of carbon based on the total weight of the silicon carbon composite.

B) Formation of Polymer Layer by Polymer Surface Treatment

A surface of the silicon carbon composite was treated with a material including the following two polymers mixed therein to form a polymer layer.

First, a round-bottom flask was filled with nitrogen, and then, 6.6488 g (0.0208 mol) of 2,2'-bis trifluoromethyl benzidine (TFDB) and 1.0530 g (0.0069 mol) of 3,5-diaminobenzoic acid (DABA) were added to the flask, followed by the addition of 180 g of N-methylpyrrolidone (NMP) thereto. The resultant mixture was completely dissolved by using a mechanical stirrer. Subsequently, 12.2982 g (0.0277 mol) of 4,4'-(hexafluoroisopropylidene)diphthalic anhydride (6FDA) was added thereto, and then, the resultant was stirred at room temperature for 24 hours, thereby obtaining a polyamic acid represented by Formula 9 (having a Mw of about 89,000 Da). Polyamic acid is a random copolymer. The molar ratio of 6FDA:TFDB:DABA was 4:3:1. In Formula 9, a molar ratio of n:m was 3:1.

10 g of LiOH aqueous solution (0.5 equivalents with respect to carboxylic acid) was added to polyamic acid represented by Formula 9 (6FDA:TFDB:DABA, acid equivalent=210 g/eq, Mw=about 89,000 Da) to prepare a water-soluble polyamic acid represented by Formula 10 in which 0.5 equivalents of the carboxylic acid moieties (COOH) of polyamic acid were substituted with Li cations (COO—Li$^+$).

The water-soluble polyamic acid represented by Formula 10 and polyvinyl alcohol (Mw=about 89,000 Da, degree of hydrolysis greater than 99 wt %) were mixed at a weight ratio of 10:90 to prepare a polymer solution having 10% of solids, and this was used as a surface treating solution. The silicon carbon composite prepared above and the polymer solution were mixed so that an amount of the polymer solution was 2 parts by weight based on 100 parts by weight of the silicon carbon composite to prepare an active material-polymer mixed solution. Then, the mixed solution was ultrasound-treated for 10 minutes and stirred for 3 hours to evenly disperse the silicon carbon composite in the polymer solution.

A solvent in the mixed solution was removed using a convection oven, and the resultant was heat-treated in a vacuum oven at 180° C. for 2 hours to form a polymer layer on a surface of the silicon carbon composite. The polymer layer was prepared as a cross-linked product of polyamic acid and polyvinyl alcohol, the cross-linked product obtained by the formation of an ester linker by reacting a carboxyl group in polyamic acid with a hydroxyl group of polyvinyl alcohol. The cross-linked product had a 3-dimensional network structure as polyimide and polyvinyl alcohol cross-linked at a plurality of points.

The positive electrode and the negative electrode described above were used, a separator was a PTFE separator, and an electrolyte was prepared as a 1.3 M solution of $LiPF_6$ in a solvent mixture including EC, ethylmethylcarbonate (EMC), and DEC at a volume ratio of 3:5:2 to prepare a 18650 type coin full cell.

Example 2

A negative active material was prepared in the same manner as in Example 1, and coin half cell and a coin full Formula 9

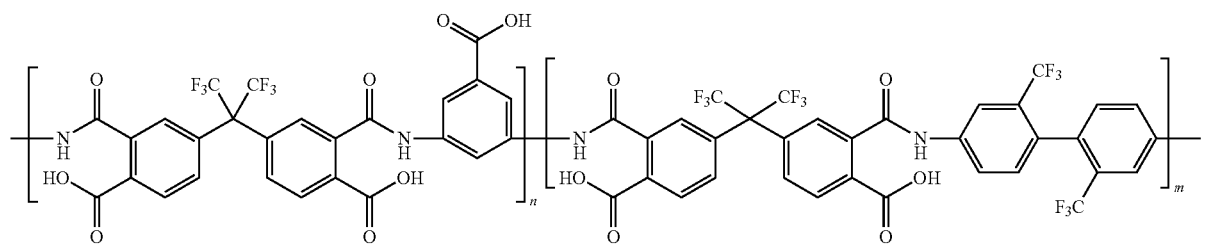

Formula 10

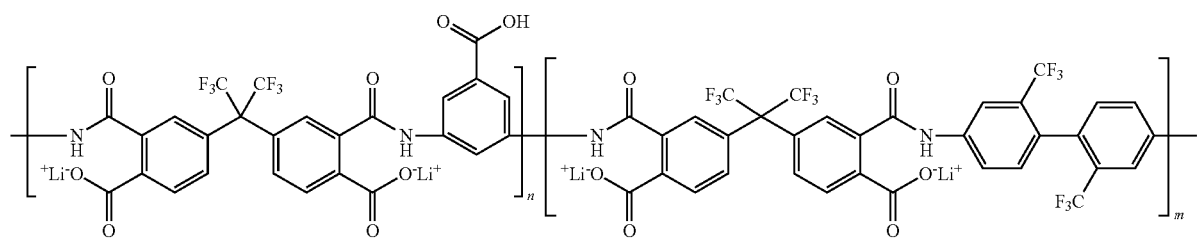

(2) Preparation of Coin Half Cell

The negative active material thus prepared and a binder comprising polyvinyl alcohol and polyacrylic acid (PVA-PAA) were homogeneously mixed at a weight ratio of 97:3 to prepare a negative electrode slurry.

The negative electrode slurry was coated on a copper foil current collector having a thickness of 10 μm to prepare an electrode plate, and the electrode plate after the coating was dried at 120° C. for 15 minutes. Then, the electrode plate was pressed to prepare a negative electrode. An electrode specific capacity was 550 milliampere-hours per gram (mAh/g), and an electrode density was 1.5 grams per cubic centimeter (g/cc).

A counter electrode was lithium metal, a separator was a PTFE separator, and an electrolyte was prepared as a 1.0 molar (M) solution of $LiPF_6$ in a solvent mixture including ethylene carbonate (EC), diethylcarbonate (DEC), and fluoroethylene carbonate (FEC) at a volume ratio of 5:70:25 to prepare a CR2032 type coin half cell.

(3) Preparation of Coin Full Cell

A negative electrode was the negative electrode used in the coin half cell, and a positive electrode was prepared as follows. $LiNi_{0.6}Co_{0.2}MnO_2O_2$ as a positive active material, and PVA-PAA as a binder were mixed at a weight ratio of 1:1 to prepare a positive electrode slurry, the positive electrode slurry was coated on an aluminum foil current collector having a thickness of 12 μm to prepare an electrode plate, and the electrode plate after the coating was then dried at 120° C. for 15 minutes. Then, the electrode plate was pressed to prepare a positive electrode.

cell were prepared in the same manner as in Example 1, except that the polymer solution was mixed so that an amount of the polymer was 4 parts by weight based on 100 parts by weight of the silicon carbon composite used in Example 1 to prepare a polymer layer.

Example 3

A negative active material was prepared in the same manner as in Example 1, and a coin half cell and a coin full cell were prepared in the same manner as in Example 1, except that a hydroxyl group was introduced on a surface of the silicon carbon composite by immersing the silicon carbon composite used in Example 1 in a 20 wt % hydrogen peroxide aqueous solution and stirring the solution for 2 hours.

Comparative Example 1

A negative active material was prepared in the same manner as in Example 1, and a coin half cell and a coin full cell were prepared in the same manner as in Example 1, except that the silicon carbon composite used in Example 1 was used as a negative active material without forming a polymer layer.

Comparative Example 2

A negative active material was prepared in the same manner as in Example 1, and a coin half cell and a coin full cell were prepared in the same manner as in Example 1, except that a polymer layer was formed by preparing a water-soluble polyamic acid without adding any fluorine-containing precursor in the below manner to form a polymer layer free of a fluorine atom-containing functional group.

After a three-necked round bottom flask was filled with nitrogen, 9.9790 g (0.0498 mol) of 4,4'-oxydianiline (ODA) and 2.5275 g (0.0166 mol) of 1,3-diaminobenzoic acid (DABA) were added thereto, and then 153 g of N-methylpyrrolidone (NMP) was added thereto. The mixture was completely dissolved by using a mechanical stirrer. Next, 14.4935 g (0.0664 mol) of pyromellitic dianhydride (PMDA) was added thereto and the flask was maintained at room temperature for 24 hours while stirring to prepare polyamic acid (PMDA/ODA/DABA, acid equivalents: 210 g/eq., Mw: about 1,000,000 Da). Polyamic acid is a random copolymer. A molar ratio of PMDA:ODA:DABA was 4:3:1.

Comparative Example 3

The polymer solution prepared in Example 1 was not used as a surface treating solution, and was instead separately heat-treated at 180° C. for 2 hours in a vacuum oven to perform a cross-linking reaction to prepare a cross-linked polymer, and this was used as a binder.

The silicon carbon composite and the cross-linked polymer as a binder were homogeneously mixed at a weight ratio of 95:5 to prepare a negative electrode slurry. A coin half cell and a coin full cell were prepared in the same manner as in Example 1, except that the negative electrode slurry was used to prepare a negative electrode.

Evaluation Example 1

SEM and EDX Analysis

Figure 4A:
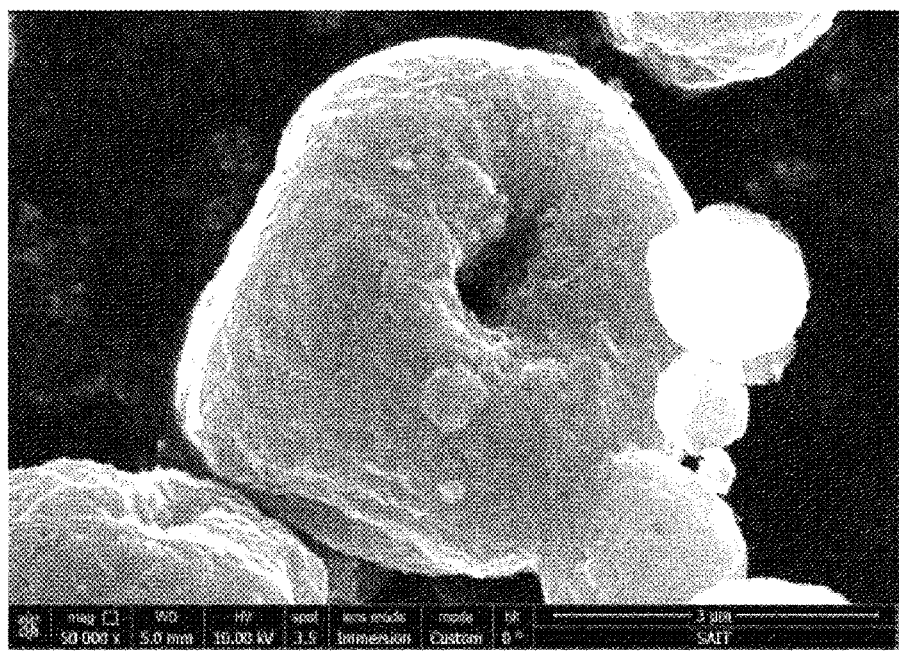
FIG. 4A is a scanning electron microscope (SEM) image of a negative active material of Comparative Example 1.
Figure 4B:
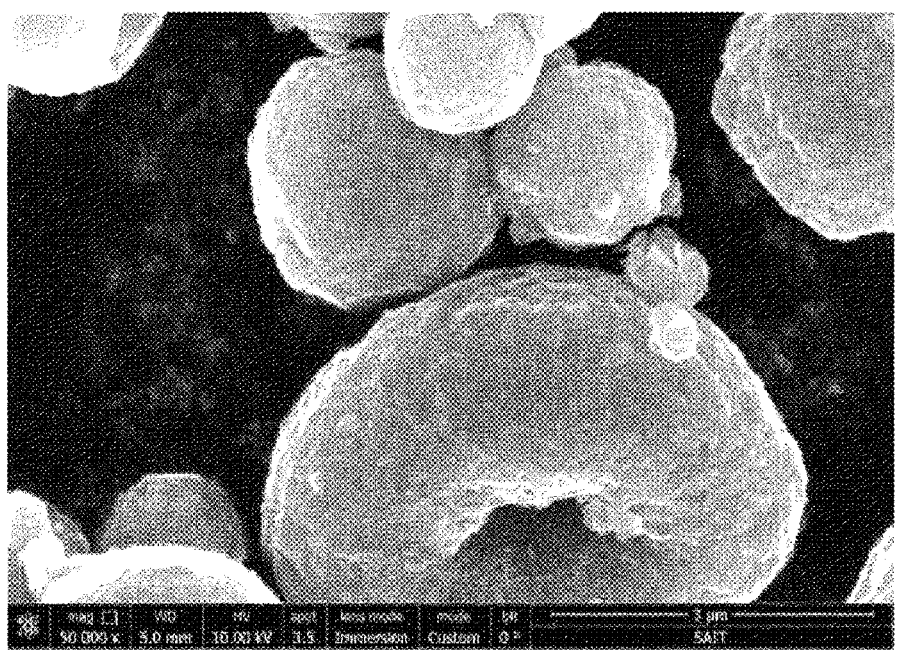
FIG. 4B is an SEM image of a negative active material of Example 1.
Figure 5A:
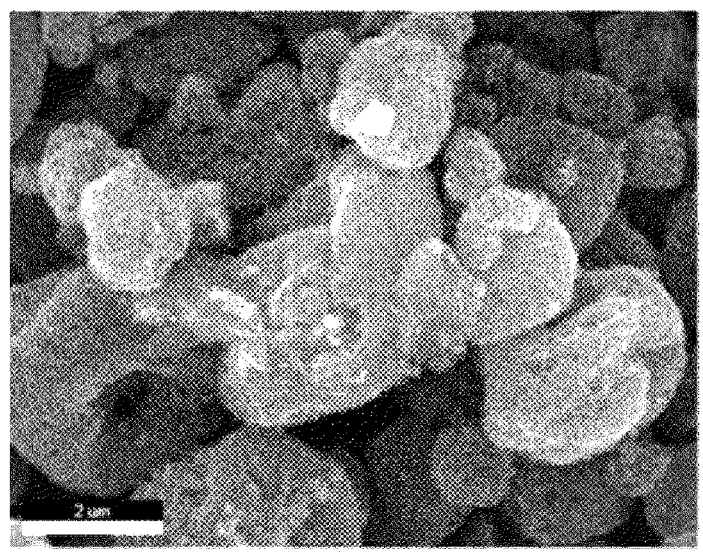
Figure 5B:
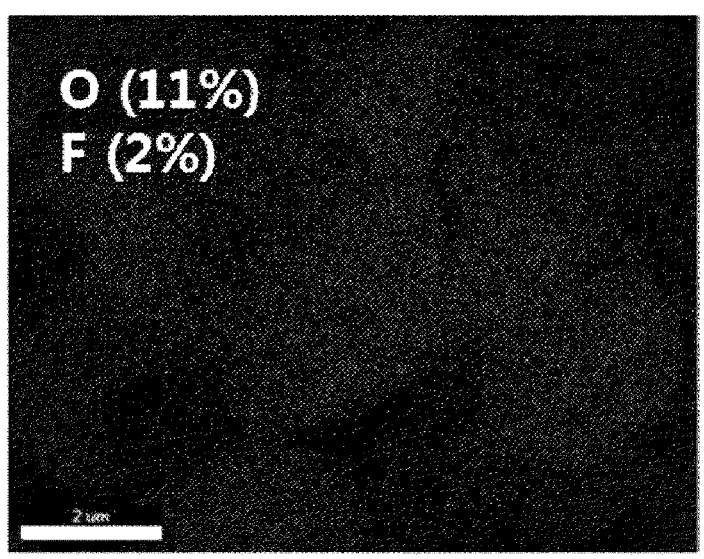
Figure 5C:
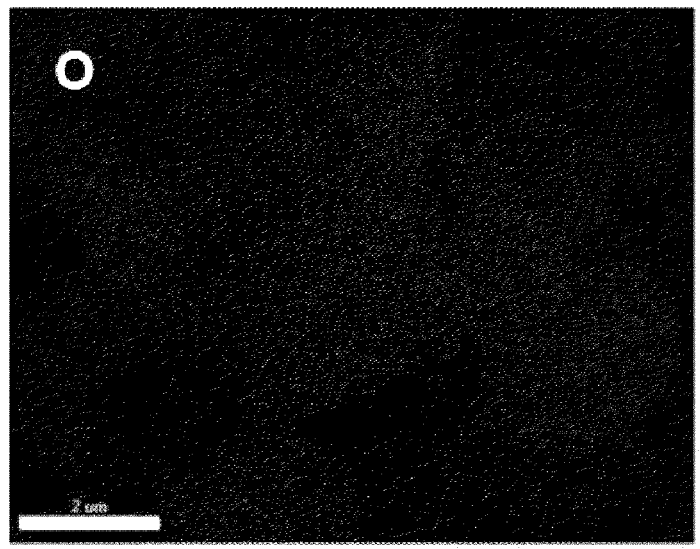
Figure 5D:
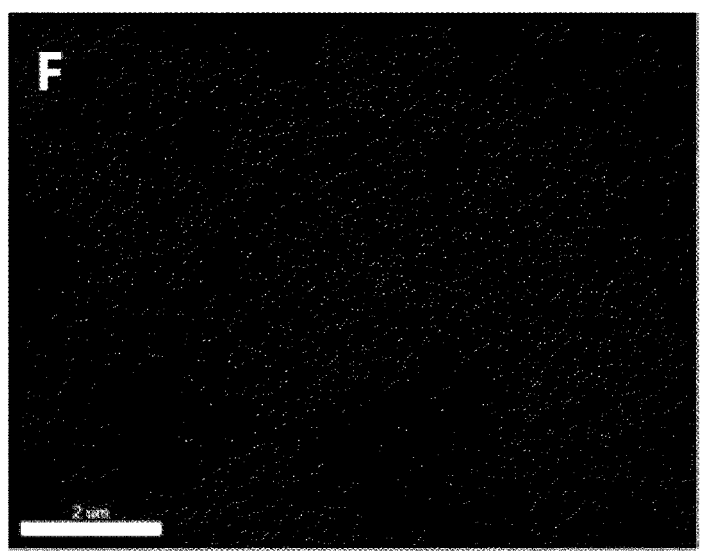

Scanning electron microscope (SEM) analysis was performed on the negative active materials prepared in Comparative Example 1 and Example 1, and the SEM images are shown in FIGS. 4A and 4B.

As shown in FIGS. 4A and 4B, surface morphology of Comparative Example 1 and Example 1 were observed, and since Example 1 had a fine layer which was 2 wt % based on the active material core and was coated on the negative active material, the existence of the polymer layer could not be confirmed by the SEM image.

However, the results of EDX mapping analysis performed on the negative active material of Example 1 is shown in FIGS. 5A to 5D, and a fluorine atom existing on a surface of the silicon carbon composite was observed through the EDX mapping.

Evaluation Example 2

Specific Surface Area Analysis

Figure 6:
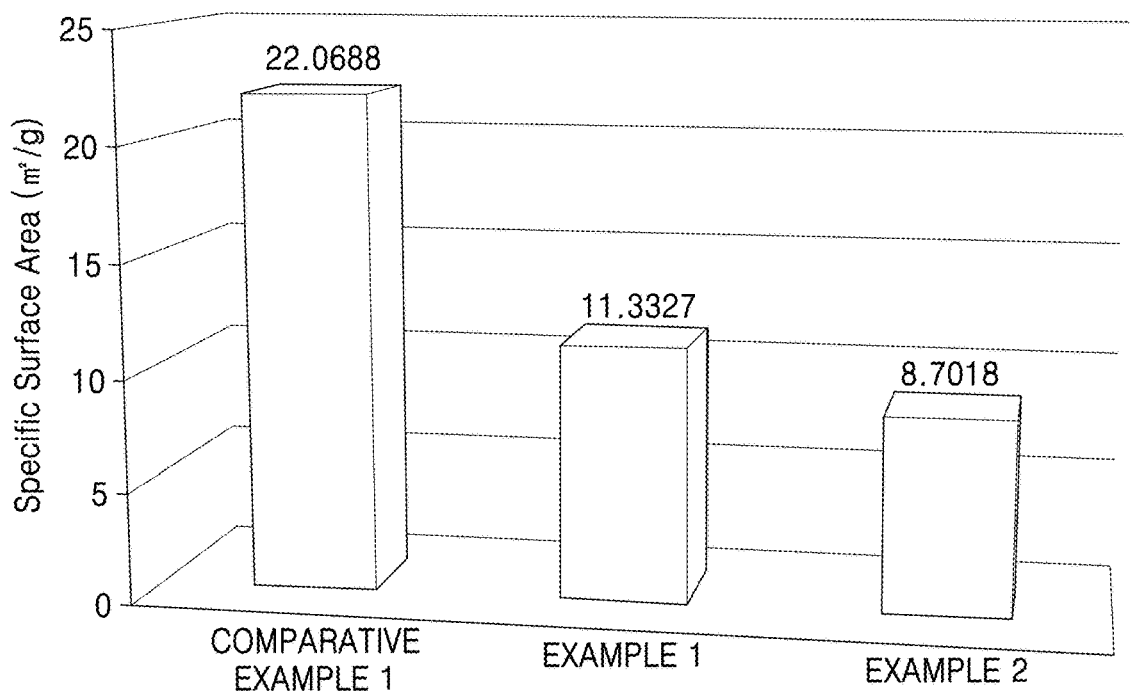
FIG. 6 is a histogram of specific surface area (SSA, square meters per gram, $m^2/g$) versus example number and shows the results of specific surface area measurement of negative active materials of Comparative Example 1 and Examples 1 and 2.

Specific surface areas of the negative active materials prepared in Comparative Example 1 and Examples 1 and 2 were measured by using a Brunauer-Emmett-Teller (BET) method, and the results are shown in FIG. 6.

As shown in FIG. 6, the silicon carbon composite had a specific surface area that was significantly decreased by formation of the polymer layer, and it was confirmed that the specific surface area decreased as an amount of surface treatment increased.

Evaluation Example 3

Initial Performance Evaluation

Initial performances of the coin half cells prepared in Comparative Example 1 and Examples 1 to 3 were evaluated as follows.

In order to measure a voltage profile of the coin half cells of Comparative Example 1 and Example 1, first, in a cycle (n=1) for a formation process at room temperature (25° C.), each of the coin half cells was charged with a constant current at a C-rate of 0.05 C (unit: milliamperes per gram (mA/g), 1 C=2500 mA/g) until a voltage was 0.01 volts (V) (vs. Li) and then discharged with a constant current at a rate of 0.05 C until a voltage was 1.5 V (vs. Li) to perform a formation process.

Then, in the 1st cycle (n=1) at room temperature (25° C.), each of the coin cells was charged with a constant current at a C-rate of 0.1 C (unit: mA/g) until a voltage was 0.01 V (vs. Li), and then charged with a constant voltage while maintaining a voltage of 0.01 V until a current of 0.05 C was reached. Thereafter, the cell was discharged with a constant current at a range of 0.1 C until a voltage was 1.5 V (vs. Li). Next, the cell had a 10 minute period of rest. Subsequently, in the 2nd cycle (n=2) at room temperature (25° C.), each of the coin half cells was charged with a constant current at a rate of 0.2 C until a voltage was 0.01 V (vs. Li), and then charged with a constant voltage while maintaining a voltage of 0.01 V until a current of 0.05 C was reached. Thereafter, the cell was discharged with a constant current at a range of 0.2 C until a voltage was 1.0 V (vs. Li). Next, the cell had a 10 minute period of rest. In the third cycle and thereafter (n≥3) at room temperature (25° C.), each of the coin half cells was charged with a constant current at a rate of 1.0 C until a voltage was 0.01 V (vs. Li), and then charged with constant voltage while maintaining a voltage of 0.01 V until a current of 0.05 C was reached. Thereafter, the cell was discharged with a constant current at a rate of 1.0 C until a voltage was 1.0 V (vs. Li).

Figure 7:
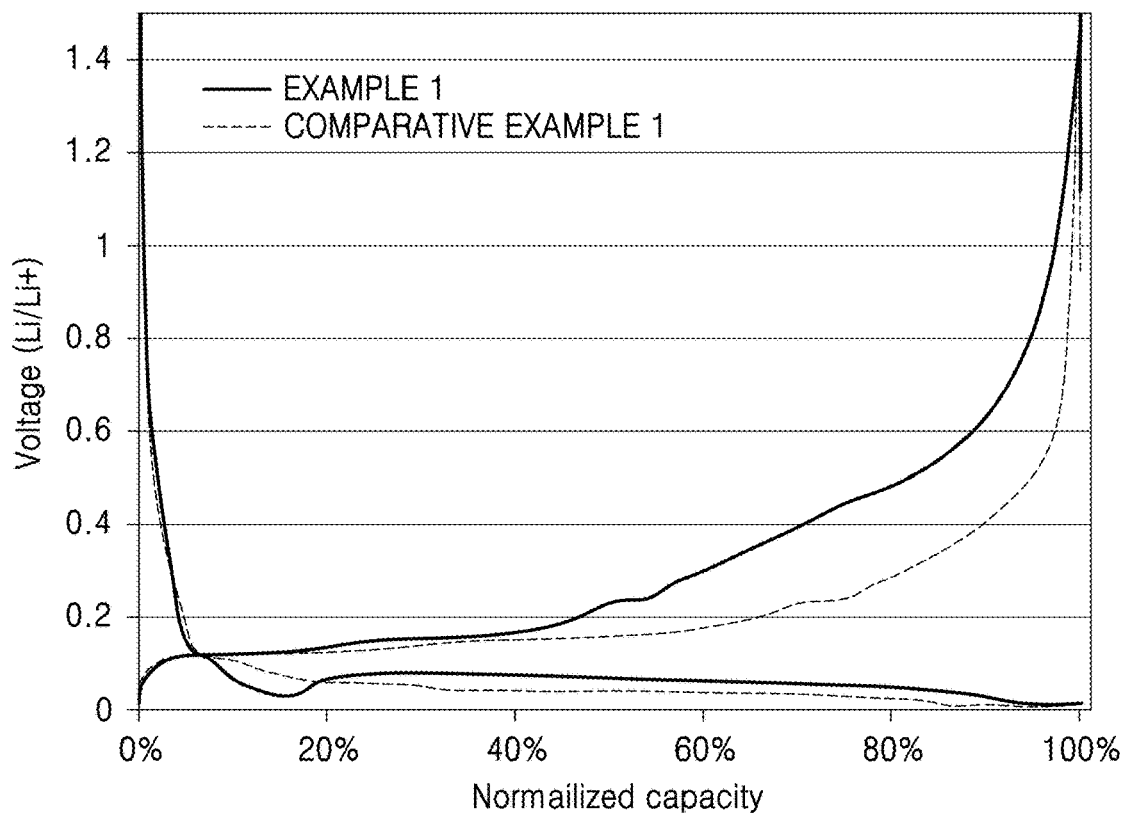
FIG. 7 is a graph of voltage (volts vs. Li/Li$^+$, V) versus normalized capacity (%) and shows a voltage profile of voltage measurement of lithium secondary batteries of Comparative Example 1 and Example 1.

After the charging/discharging process described above was performed, voltage profiles of the coin half cells were evaluated, and the results are shown in FIG. 7.

Figure 8:
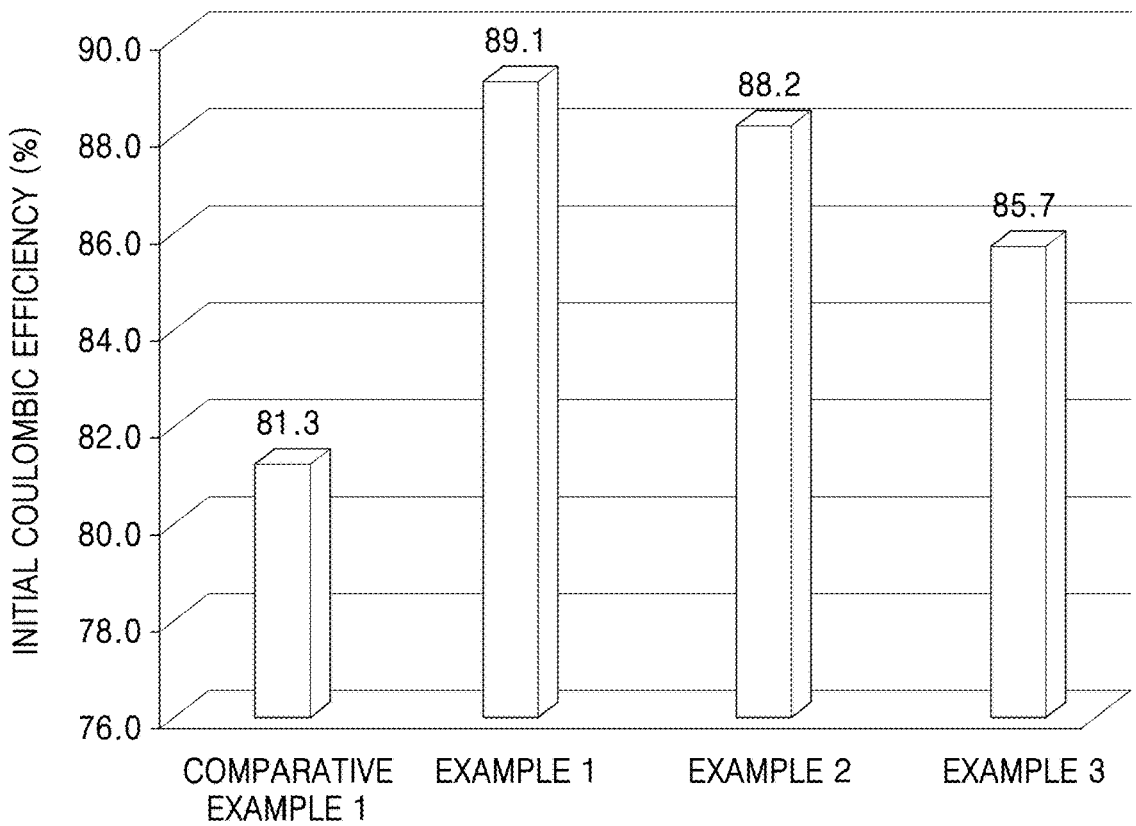
FIG. 8 is a histogram of initial Coulombic efficiency (%) versus examples number and shows the results of initial Coulombic efficiency measurements of lithium secondary batteries of Comparative Example 1 and Examples 1 to 3.

Initial Coulomb efficiencies were calculated as defined in Equation 1, and the results are shown in FIG. 8.

Initial efficiency [%]=[Discharge capacity at 1st cycle/charge capacity at 1st cycle]×100%     Equation 1

When the polymer coating layer existed on a surface of the active material, an initial efficiency improved as a result of the battery evaluation, and this is deemed as due to the coating layer that induced stabilization of an SEI layer formed on the active material surface at an initial state, which decreased consumption of irreversible lithium.

Figure 9:
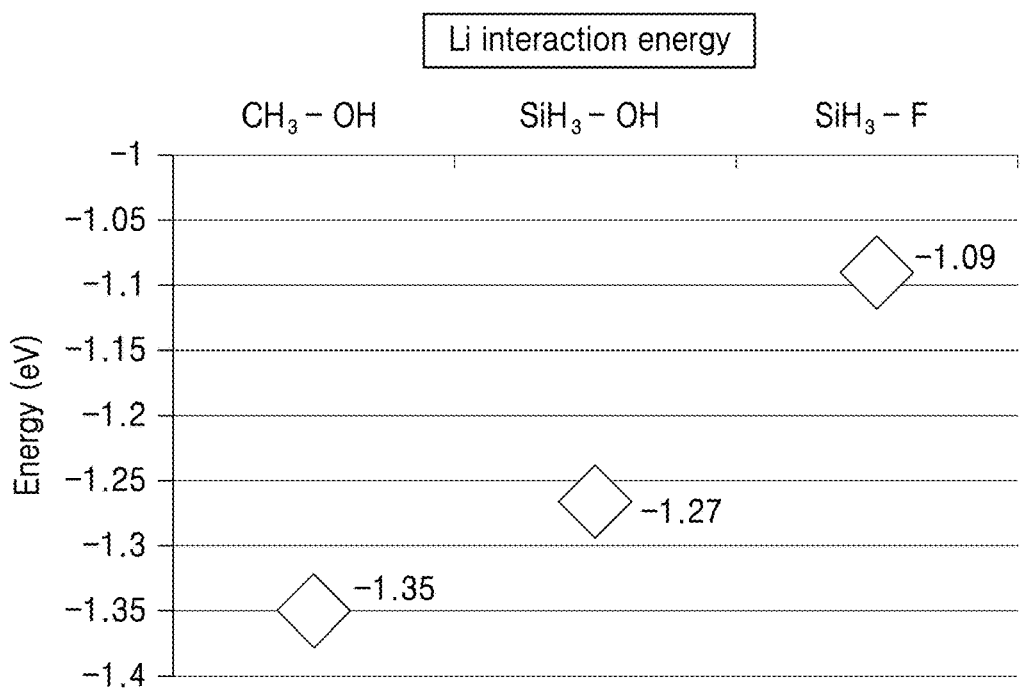
FIG. 9 is a graph of energy (electron volts, eV) versus functional group and shows interaction energy of Li according to surface functional groups of carbon and silicon.

As reference, bonding energy with Li according to bonding of —OH and —F functional groups on surfaces of carbon and silicon was calculated and is shown in FIG. 9.

As shown in FIGS. 7 to 9, it seems that the fluorine (—F) functional group, compared to the hydroxyl —OH functional group, induced the bonding energy between the active material surface and lithium ions to be lower. As a result, formation of a polymer layer containing a fluorine group on a surface of the active material decreased a side reaction of the surface of the active material, and thus it was confirmed that in this regard, an initial efficiency of Example 1 increased about 7 to 8% compared to an initial efficiency of Comparative Example 1.

Also, Example 2 had a thick polymer layer which was formed due to the greater amount of the introduced polymer, and the initial efficiency of Example 2 was reduced compared to that of Example 1. In the case of Example 3, having a hydroxyl functional group introduced on the surface of the active material, it can be confirmed that the abundance of introduced hydroxyl functional groups on the surface reacted with lithium ions and thus lowered the initial efficiency. However, according to the evaluation of lifetime characteristics later described, it is confirmed that the greater amount of the polymer layer or a hydroxyl functional group on the surface of the active material lead to an irreversible lithium consumption reaction at an initial stage but stabilize the electrode as the number of cycles progresses, thereby improving lifetime characteristics. Evaluation of lifetime characteristics is described below.

Evaluation Example 4

Evaluation of Lifetime Characteristics and Comparison of Internal Resistance Change At 25° C., the coin cells prepared in Comparative Example 1 and Examples 1 to 3 were each charged with a constant current at a rate of 0.1 C until a voltage was 0.01 V (vs. Li) and charged with a constant voltage while maintaining a voltage of 0.01 V until a current was 0.01 C. The lithium battery after charging was rested for 10 minutes and then discharged with a constant current at a rate of 0.1 C until a voltage was 1.5 V (vs. Li) (1st cycle).

Next, the cell was charged with a constant current at a rate of 0.2 C until a voltage was 0.01 V (vs. Li) and charged with a constant voltage while maintaining a voltage of 0.01 V until a current was 0.01 C. The coin cell after charging was rested for 10 minutes and then discharged with a constant current at a rate of 0.2 C until a voltage was 1.5 V (vs. Li) ($2^{nd}$ cycle) (where 1st and $2^{nd}$ cycles are formation processes)

At 25° C., the coin cell after the formation process was charged with a constant current at a rate of 1.0 C until a voltage was 0.01 V (vs. Li) and charged with a constant voltage while maintaining a voltage of 0.01 V until a current was 0.01 C. The coin cell after charging was rested for 10 minutes and then discharged with a constant current at a rate of 1.0 C until a voltage was 1.5 V (vs. Li). This cycle was repeated 100 times.

A capacity retention percentage and a Coulombic efficiency were calculated as defined in Equation 2 and Equation 3, each respectively. In Equation 2, the "discharge capacity at each cycle" means the discharge capacity at a specified cycle after the third cycle, because the first and second cycles represent formation cycles.

Capacity retention [%]=[Discharge capacity at each cycle/discharge capacity at third cycle]×100%    Equation 2

Coulombic efficiency [%]=[Discharge capacity at each cycle/charge capacity at each cycle]×100%    Equation 3

Figure 10:
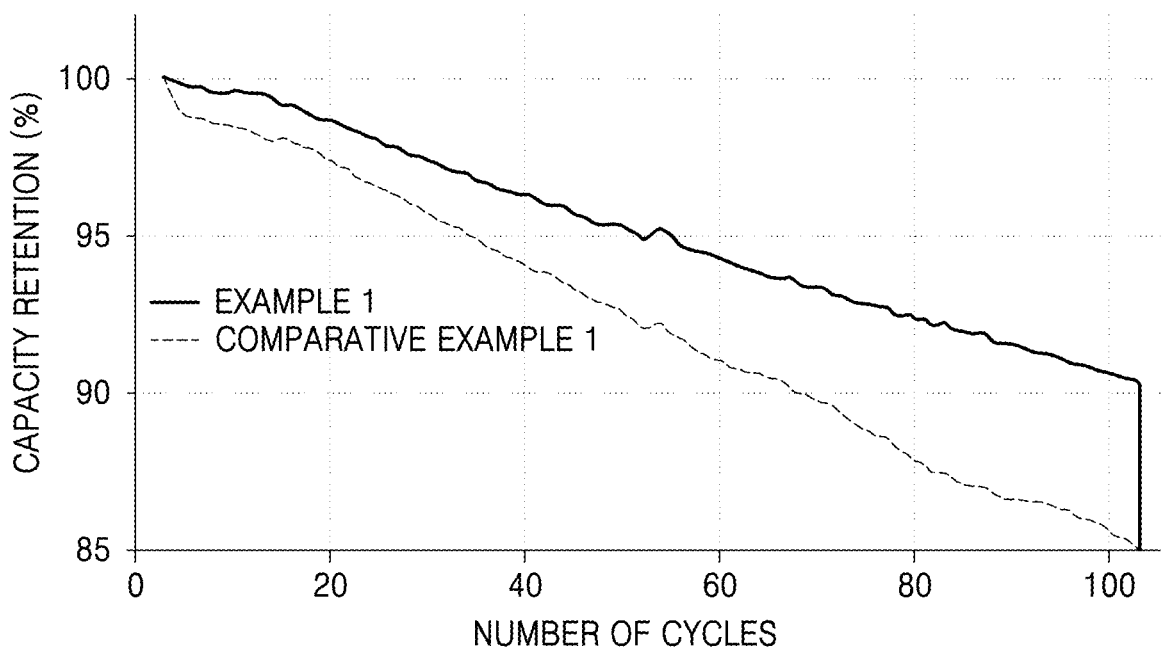
FIG. 10 is a graph of capacity retention (%) versus number of cycles and shows the results of measuring capacity retention ratios per cycle of coin half cells of Comparative Example 1 and Example 1.
Figure 11:
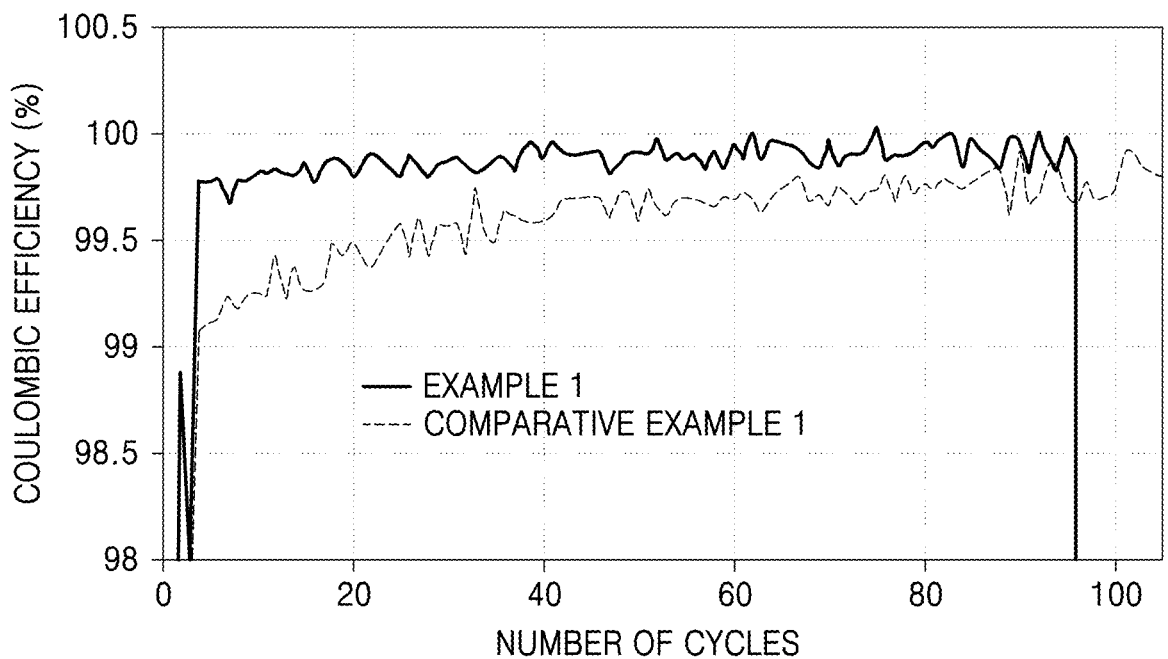
FIG. 11 is a graph of Coulombic efficiency versus number of cycles and shows the results of measuring Coulombic efficiencies per cycle of the coin half cells of Comparative Example 1 and Example 1.

The results of measuring capacity retentions and Coulomb efficiencies per cycle of the coin half cells of Comparative Example 1 and Example 1 are shown in FIGS. 10 and 11, each respectively.

Figure 12:
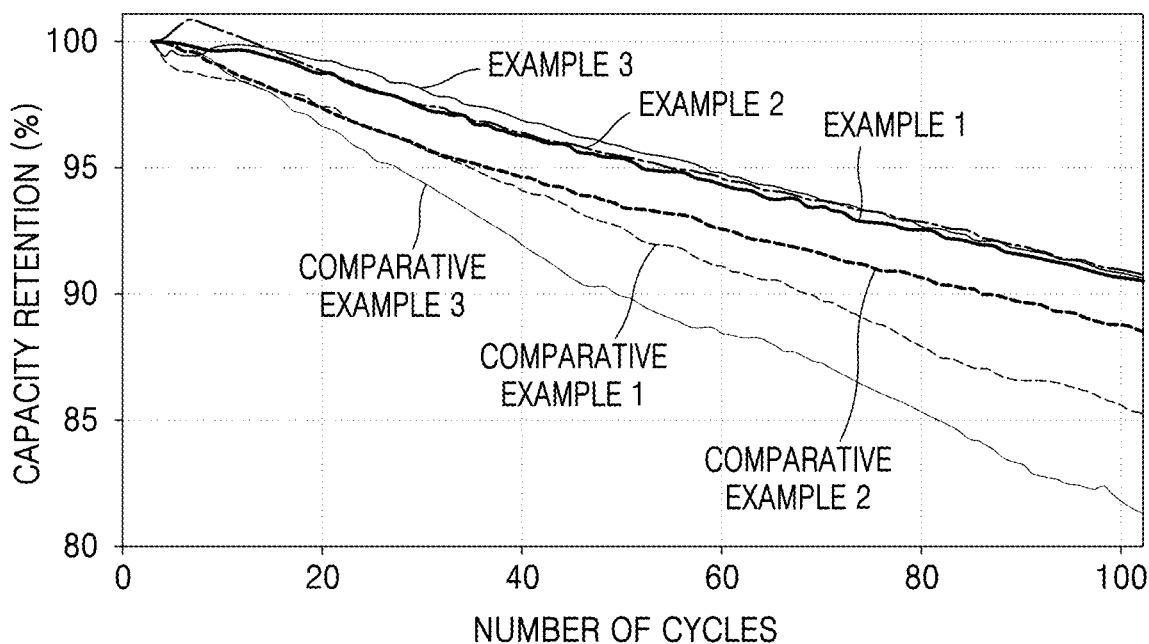
FIG. 12 is a graph of capacity retention (%) versus number of cycles and shows the results of measuring capacity retention ratios per cycle of coin full cells of Comparative Examples 1 to 3 and Examples 1 to 3.
Figure 13:
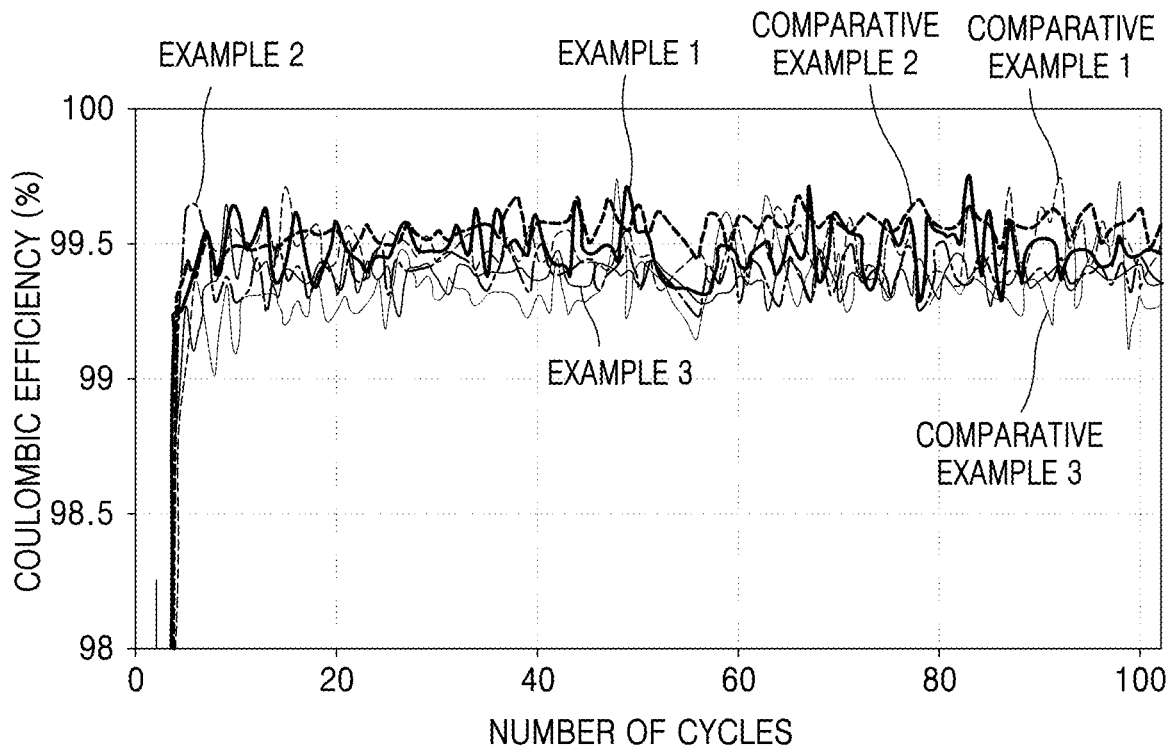
FIG. 13 is a graph of Coulombic efficiency versus number of cycles and shows the results of measuring Coulombic efficiencies per cycle of the coin full cells of Comparative Examples 1 to 3 and Examples 1 to 3.

Also, the results of measuring capacity retentions and Coulomb efficiencies per cycle of the coin full cells of Comparative Examples 1 to 3 and Examples 1 to 3 are shown in FIGS. 12 and 13, each respectively.

As shown in FIGS. 10 to 13, the results of the evaluation of lifetime characteristic confirmed that lifetime characteristics of the coin full cells as well as the coin half cells of Examples 1 to 3 improved by about 5% compared to those of Comparative Example 1 after 100 cycles.

Figure 14:
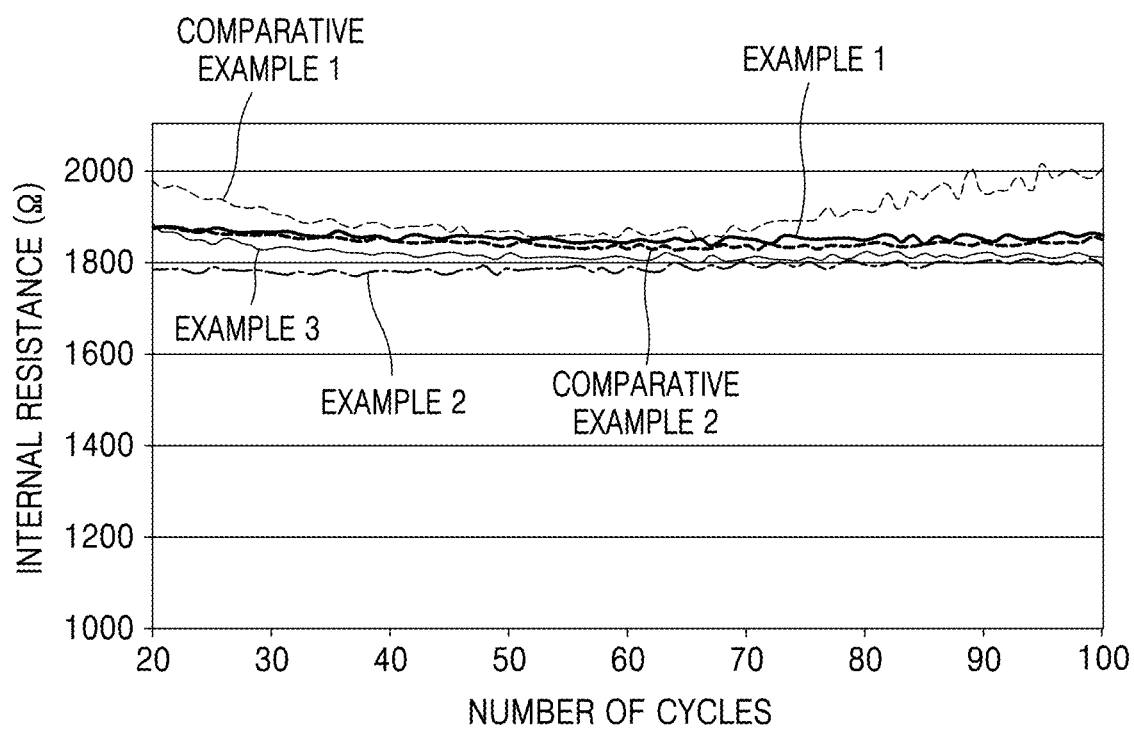
FIG. 14 is a graph of internal resistance (ohm, Ω) versus number of cycles and shows the results of measuring internal resistance per cycle of the coin full cells of Comparative Examples 1 to 2 and Examples 1 to 3.

The results of measuring changes in internal resistance according to charging/discharging of the coin full cells of Comparative Examples 1 to 2 and Examples 1 to 3 are shown in FIG. 14. As shown in FIG. 14, the coin full cell of Comparative Example 1 had a resistance increased due to deterioration of the active material as the cycle progressed, whereas the coin full cells of Examples 1 to 3 all showed stable resistance values.

Evaluation Example 5

XPS Evaluation

In order to confirm a function of the surface treated layer during charging/discharging, the electrodes of Example 1 and Comparative Example 1 were obtained as electrodes before evaluation, electrode after formation reaction, and electrode after 100 cycles of charging/discharging, and the surface products were confirmed through an XPS analysis. The XPS analysis result at 0 minutes of the sputtering time is shown in FIG. 15A, and the XPS analysis result at 60 minutes of the sputtering time is shown in FIG. 15B.

Figure 15A:
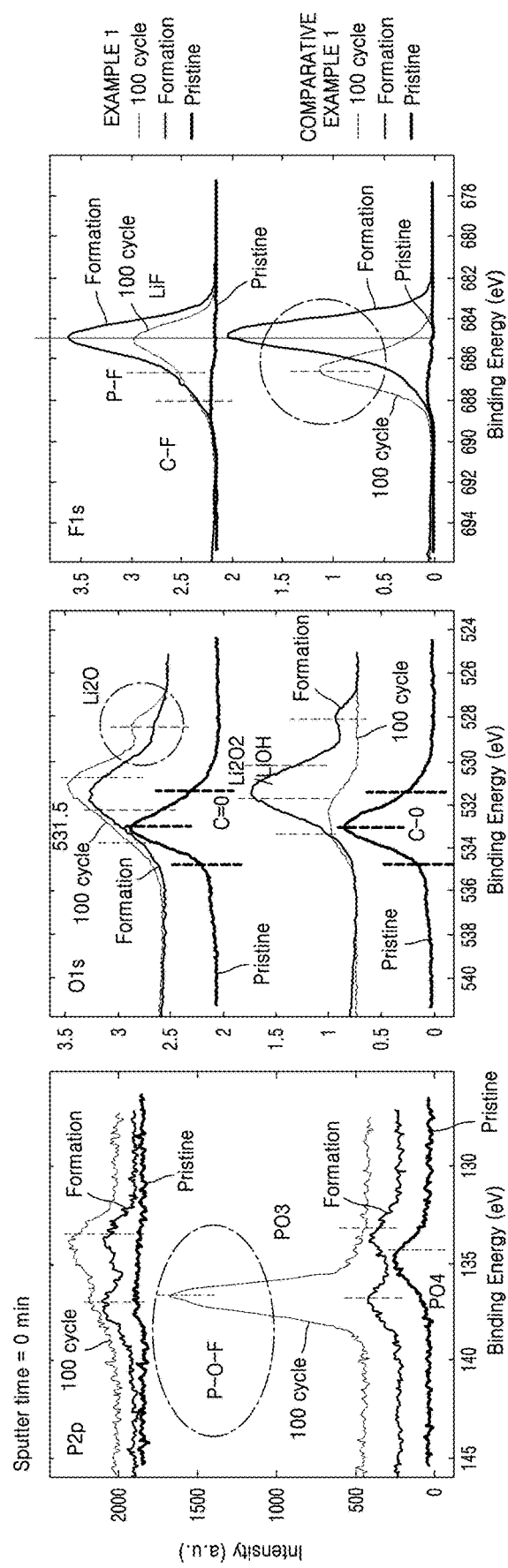
FIG. 15A is a series of graphs of intensity (arbitrary units, a.u.) versus binding energy (electron volt, eV) and shows the results of XPS measurements of the negative active materials of Comparative Example 1 and Example 1 at a sputtering time of 0 minutes.
Figure 15B:
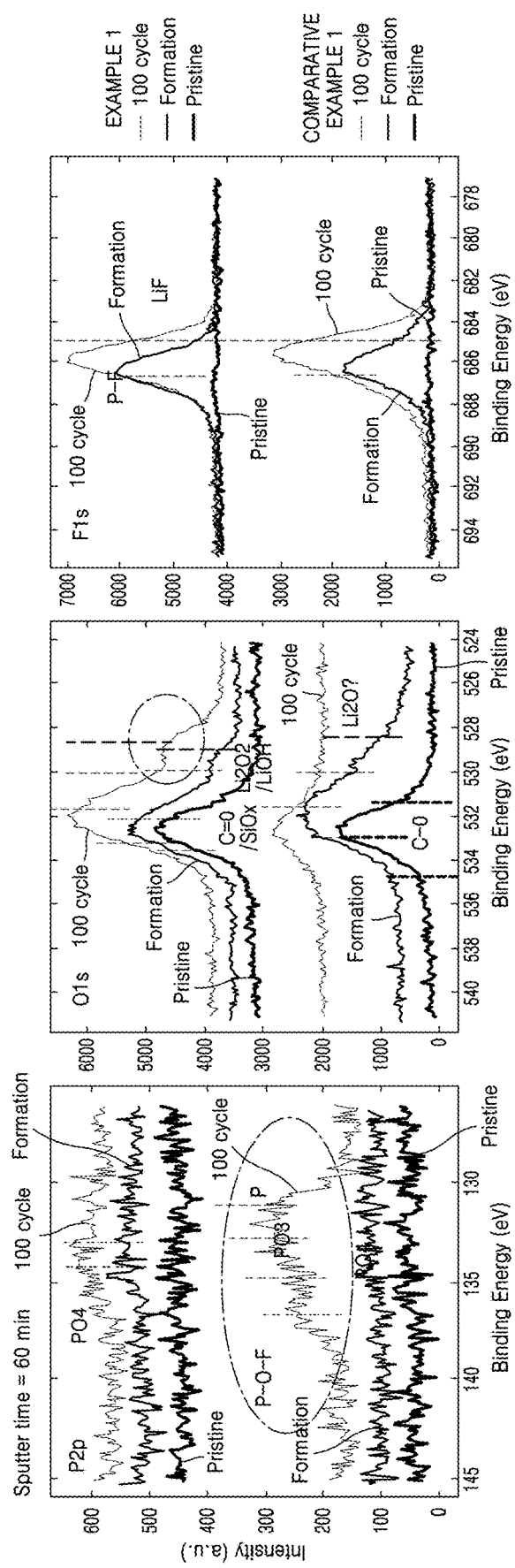
FIG. 15B is a graph of intensity (a.u.) versus binding energy (eV) and shows the results of XPS measurements of the negative active materials of Comparative Example 1 and Example 1 at a sputtering time of 60 minutes.

As shown in FIGS. 15A and 15B, in case of Comparative Example 1, a P—O—F bond observed in an electrolyte dissociation by-product was confirmed as significantly formed according to the continuous charging/discharging process, and in the case of Example 1, it was observed that a lithium oxide, which is helpful for conduction of lithium ions, was produced. In this regard, it was confirmed that in Example 1, dissociation of the electrolyte was suppressed, and a solid electrolyte phase helpful for lithium conduction was formed, and thus the battery characteristics improved compared to those of Comparative Example 1.

As described above, according to one or more embodiments, the negative active material may improve stability of an active material core structure by coating of a polymer layer and suppress a side reaction with an electrolyte on a surface of the active material core, and thus may improve Coulombic efficiency of a lithium secondary battery and lifetime characteristics.

It should be understood that embodiments described herein should be considered in a descriptive sense and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative active material comprising:
   an active material core; and
   a polymer layer disposed on a surface of the active material core,
   wherein the polymer layer comprises a third polymer comprising a cross-linked product of a first polymer and a second polymer,
   wherein the first polymer is at least one of polyamic acid, polyimide, or a copolymer thereof, and comprises a first functional group,
   wherein the second polymer is water-soluble and comprises a second functional group,
   wherein the first polymer and the second polymer are cross-linked by an ester bond that is formed through at least one reaction starting from the first functional group and the second functional group, and wherein at least one of the first polymer and the second polymer further comprises a halogen group.

2. The negative active material of claim 1, wherein the halogen group is a fluorine group, a chlorine group, a bromine group, an iodine group, or a combination thereof.

3. The negative active material of claim 1, wherein the first functional group and the second functional group are each independently at least one of a carboxyl group, a hydroxyl group, an amide group, or an aldehyde group.

4. The negative active material of claim 1, wherein the first functional group is a carboxyl group and the second functional group is a hydroxyl group, or the first functional group is a hydroxyl group and the second functional group is a carboxyl group.

5. The negative active material of claim 1, wherein the first polymer further comprises an alkali metal.

6. The negative active material of claim 4, wherein an amount of the alkali metal of the first polymer is in a range of about 0.2 equivalents to about 1 equivalent, with respect to a total amount of carboxyl groups, amide groups, and carbonyl groups of the first polymer.

7. The negative active material of claim 1, wherein the polyamic acid is a compound represented by at least one of Formula 1 or Formula 2:

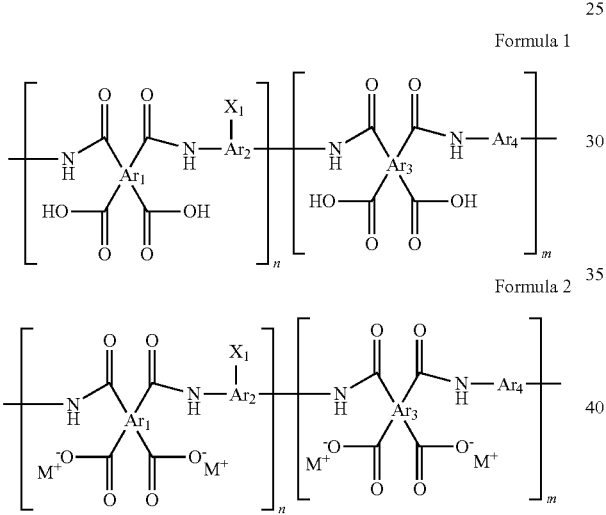

Formula 1

Formula 2 wherein, in Formulae 1 and 2,
each M is the same or different, and is an alkali metal,
each $Ar_1$ and $Ar_3$ are the same or different, and are each independently at least one aromatic group that is a substituted or unsubstituted tetravalent C6-C24 arylene group or a substituted or unsubstituted tetravalent C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si($R_a$)($R_b$)— wherein $R_a$ and $R_b$ are each independently a C1-C10 alkyl group, a substituted or unsubstituted C1-C10 alkylene group, or —C(=O)—NH—,
each $Ar_2$ and $Ar_4$ are the same or different, and are each independently at least one aromatic group that is a substituted or unsubstituted C6-C24 arylene group or a substituted or unsubstituted C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si(Ra)(Rb)— wherein Ra and Rb are each independently a C1-C10 alkyl group), a substituted or unsubstituted C1-C10 alkylene group, or —C(=O)—NH—,
at least one of $Ar_1$ to $Ar_4$ is substituted by a halogen group,
each $X_1$ is the same or different, is the first functional group, and is —COOH or —OH, and
n and m are each mole fractions in repeating units, wherein n and m for Formulae 1 and 2 each independently satisfy 0<n≤1, 0≤m<1, and n+m=1.

8. The negative active material of claim 7, wherein $Ar_1$ and $Ar_3$ are each independently at least one of Formulae 1a and 1b, and $Ar_2$ and $Ar_4$ are each independently at least one of Formulae 1c to 1e:

Formula 1a

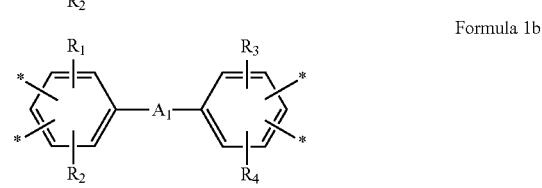

Formula 1b

Formula 1c

Formula 1d

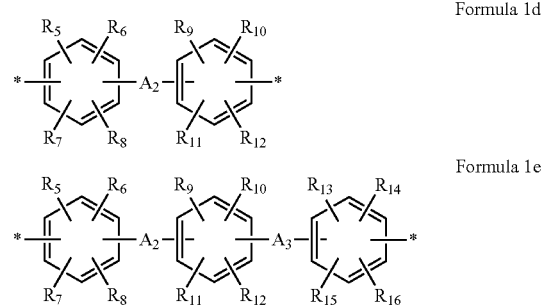

Formula 1e wherein, in Formulae 1a to 1e,
$R_1$ to $R_{16}$ are each independently hydrogen, a halogen atom, —COOH, —OH, —CO—NH$_2$, —COH, a C1-C10 alkyl group substituted or not substituted with a halogen atom, a C6-C20 aryl group substituted or not substituted with a halogen atom, or a C2-C20 heteroaiyl group substituted or not substituted with a halogen atom, wherein at least one of $R_1$ to $R_{16}$ is a halogen group or is substituted by a halogen group; and
$A_1$, $A_2$, and $A_3$ are each independently a single bond, —O—, —C(=O)—, —S—, —S(=O)$_2$—, —Si($R_a$) ($R_b$)—wherein $R_a$ and $R_b$ are each independently a C1-C10 alkyl group a C1-C10 alkylene group substituted or not substituted with a halogen atom, or —C(=O)—NH—,
wherein, when $Ar_2$ is one of Formulae 1c to 1e, at least one of $R_5$ to $R_{16}$ is the first functional group and is COOH, —OH, —CO—NH$_2$, or —COH.

9. The negative active material of claim 1, wherein polyamic acid is a compound represented by at least one of Formula 3 or Formula 4:

Formula 3

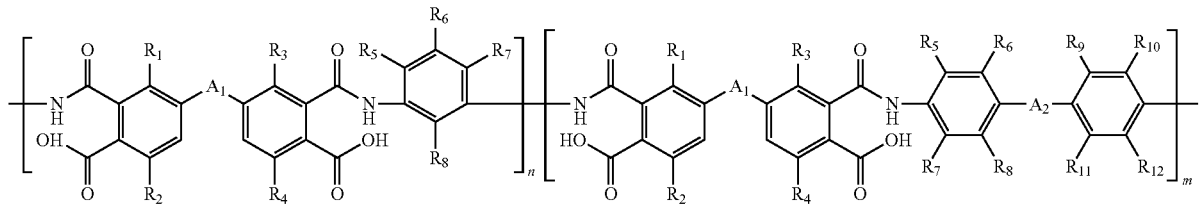

Formula 4

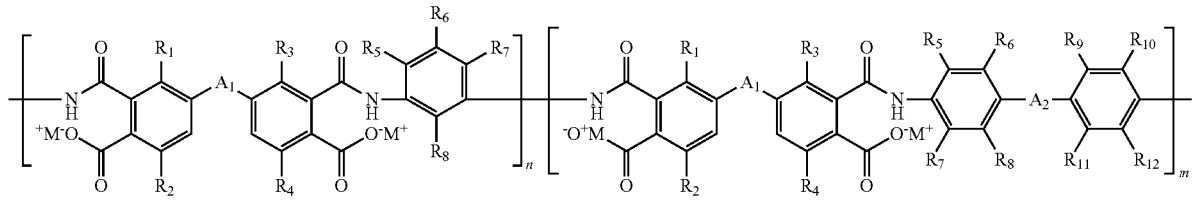

wherein, in Formulae 3 and 4, each M is the same or different, and is independently lithium or sodium, each $R_1$ to $R_{12}$ are the same or different, and are each independently hydrogen, a halogen atom, —COOH, —OH, —CO—NH$_2$, —COH, a C1-C10 alkyl group substituted or not substituted with a halogen atom, a C6-C20 aryl group substituted or not substituted with a halogen atom, or a C2-C20 heteroaryl group substituted or not substituted with a halogen atom, wherein at least one of $R_1$ to $R_{12}$ is a halogen group or a group substituted with a halogen group, each $A_1$ and $A_2$ are the same or different, and are each independently a single bond, —O—, —S—, —C(=O)—, —S(=O)$_2$—, —Si(Ra)(Rb)— wherein Ra and Rb are each independently a C1-C10 alkyl group, a C1-C10 alkylene group substituted or not substituted with a halogen atom, or —C(=O)—NH—, wherein at least one of $R_5$ to $R_8$ is COOH, —OH, —CO—NH$_2$, or —COH, and n and m are each mole fractions of repeating units, wherein n and m for Formulae 3 and 4 each independently satisfy 0<n≤1, 0≤m<1, and n+m=1.

10. The negative active material of claim 1, wherein the polyimide is a compound represented by at least one of Formula 5 or Formula 6:

Formula 5

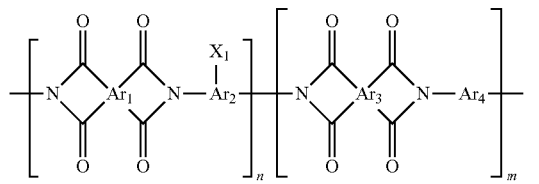

Formula 6

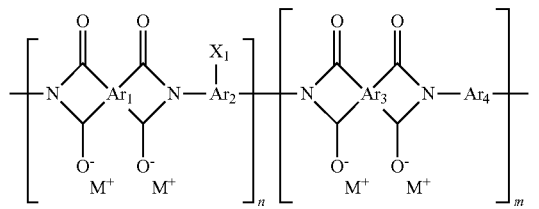

wherein, in Formulae 5 and 6,
each M is the same or different, and is an alkali metal, each $Ar_1$ and $Ar_3$ are the same or different, and are each independently an aromatic group that is a substituted or unsubstituted tetravalent C6-C24 arylene group or a substituted or unsubstituted tetravalent C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si(Ra)(Rb)— where $R_a$ and $R_b$ are each independently a C1-C10 alkyl group, a substituted or unsubstituted C1-C10 alkylene group, or —C(=O)—NH—, each $Ar_2$ and $Ar_4$ are the same or different, and are each independently at least one aromatic group that is a substituted or unsubstituted C6-C24 arylene group or a substituted or unsubstituted C4-C24 heteroarylene group, wherein the aromatic group is one aromatic ring, a ring comprising at least two aromatic rings fused to each other, or a ring comprising at least two aromatic rings linked by a single bond, —O—, —S—, —C(=O)—, —S(=O)$_2$—, —Si($R_a$)($R_b$)— wherein $R_a$ and $R_b$ are each independently a C1-C10 alkyl group, a substituted or unsubstituted C1-C10 alkylene group, or —C(=O)—NH—, at least one of $Ar_1$ to $Ar_4$ is substituted by a halogen group,
each $X_1$ is the same or different, is the first functional group, and is —COOH, —OH, —CO—NH$_2$, or —COH, and n and m are each mole fractions in repeating units, wherein n and m for Formulae 5 and 6 each independently satisfy 0<n≤1, 0≤m<1, and n+m=1.

11. The negative active material of claim 10, wherein $Ar_1$ and $Ar_3$ are each independently at least one of Formulae 1a and 1 b, and $Ar_2$ and $Ar_4$ are each independently at least one of Formulae 1c to 1e:

Formula 1a

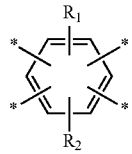

Formula 1b

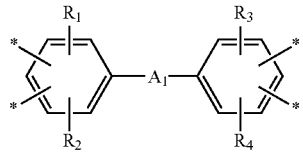

-continued

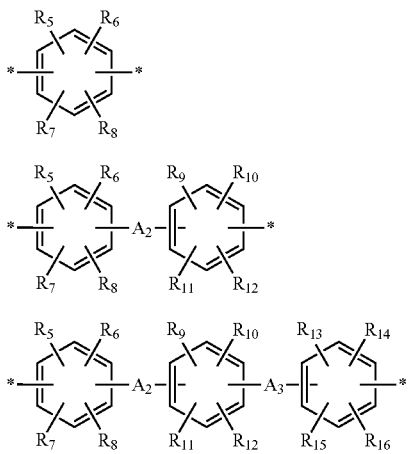

Formula 1c

Formula 1d

Formula 1e wherein, in Formulae 1a to 1e,

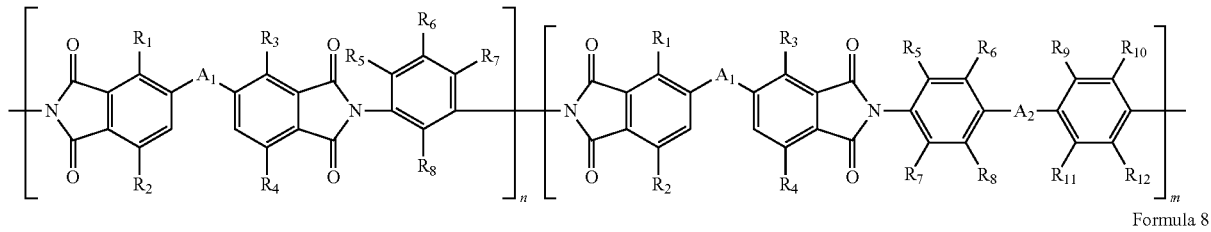

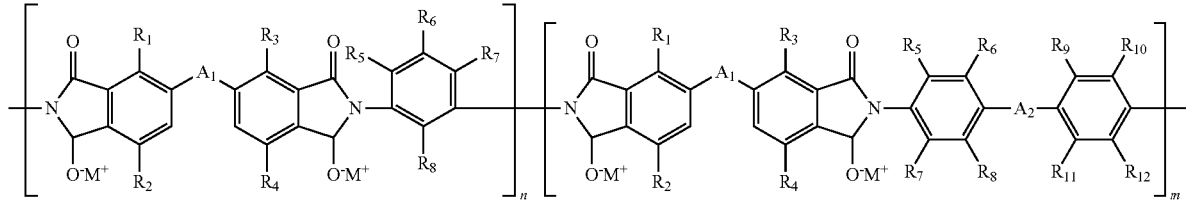

$R_1$ to $R_{16}$ are each independently hydrogen, a halogen atom, —COOH, —OH, —CO—NH$_2$, —COH, a C1-C10 alkyl group substituted or not substituted with a halogen atom, a C6-C20 aryl group substituted or not substituted with a halogen atom, or a C2-C20 heteroaiyl group substituted or not substituted with a halogen atom, wherein at least one of $R_1$ to $R_{16}$ is a halogen group or a group substituted with a halogen atom, wherein at least one of $R_1$ to $R_{16}$ is a halogen group or is substituted by a halogen group; and $A_1$, $A_2$, and $A_3$ are each independently a single bond, —O—, —C(=O)—, —S—, —S(=O)$_2$—, —Si($R_a$)($R_b$)— wherein $R_a$ and $R_b$ are each independently a C1-C10 alkyl group, a C1-C10 alkylene group substituted or not substituted with a halogen atom, or —C(=O)—NH—, wherein, when $Ar_2$ is one of Formulae 1c to 1e, at least one of $R_5$ to $R_{16}$ is the first functional group and is —COOH, —OH, —CO—NH$_2$, or —COH.

12. The negative active material of claim 1, wherein the polyimide is a compound represented by at least one of Formula 7 or Formula 8:

Formula 7

Formula 8 wherein, in Formulae 7 and 8, each M is the same or different, and is lithium or sodium, each $R_1$ to $R_{12}$ are the same or different, and are each independently hydrogen, a halogen atom, —COOH, —OH, —CO—NH$_2$, —COH, a C1-C10 alkyl group substituted or not substituted with a halogen atom, a C6-C20 aryl group substituted or not substituted with a halogen atom, or a C2-C20 heteroaryl group substituted or not substituted with a halogen atom, wherein at least one of $R_1$ to $R_{12}$ is a halogen group or a group substituted with a halogen group, each $A_1$ and $A_2$ are the same or different, and are each independently a single bond, —O—, —S—, —C(=O)—, —S(=O)$_2$—, —Si($R_a$)($R_b$)— wherein $R_a$ and $R_b$ are each independently a C1-C10 alkyl group, a C1-C10 alkylene group substituted or not substituted with a halogen atom, or —C(=O)—NH—, wherein at least one of $R_5$ to $R_8$ is the first functional group and is —COOH, —OH, —CO—NH$_2$, or —COH, and n and m are each mole fractions of repeating units, wherein n and m for Formulae 7 and 8 each independently satisfy $0<n\leq 1$, $0\leq m<1$, and $n+m=1$.

13. The negative active material of claim 1, wherein the polyamic acid is a compound represented by at least one of Formula 9 or Formula 10, and the polyimide is a compound represented by at least one of Formula 11 or Formula 12:

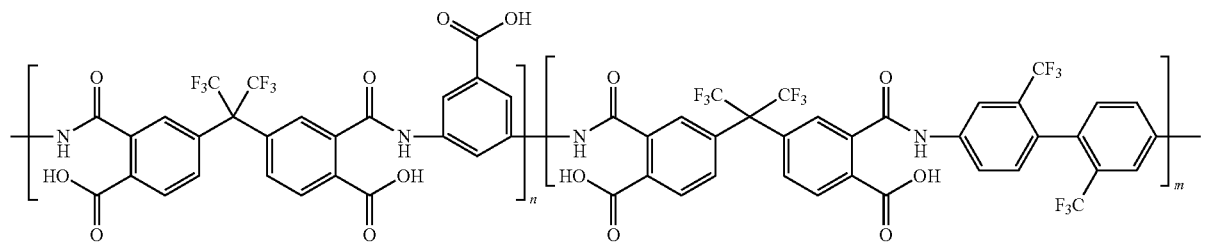

Formula 9

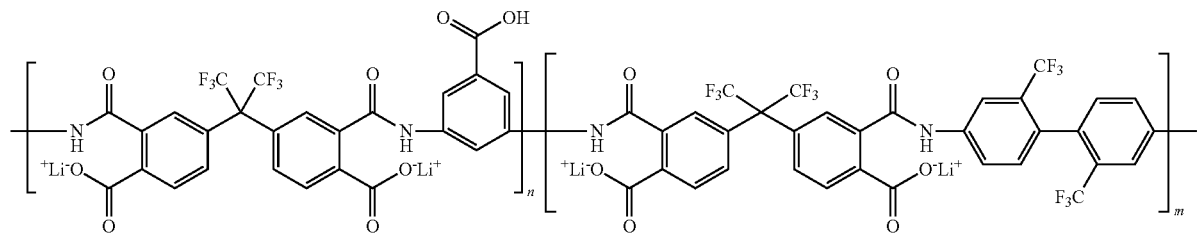

Formula 10

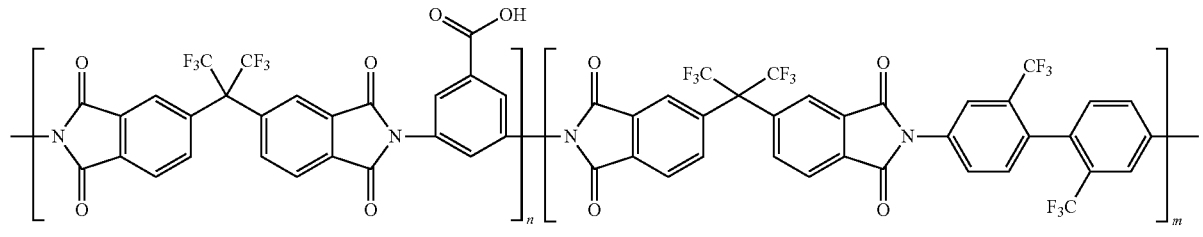

Formula 11

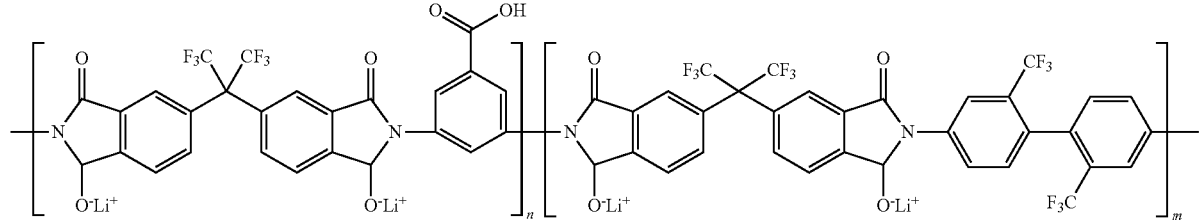

Formula 12 wherein, in Formulae 9 to 12,
n and m are each mole fraction of repeating units, wherein n and m for Formulae 9 to 12 each independently satisfy $0<n\leq 1$, $0\leq m<1$, and $n+m=1$.

14. The negative active material of claim 1, wherein the second polymer is a polymerization reaction product or its hydrolysate of at least one monomer that is a vinyl monomer, an acetate monomer, an alcohol monomer, an acryl monomer, a methacryl monomer, an acrylamide monomer, or a methacrylamide monomer.

15. The negative active material of claim 1, wherein the second polymer is a polymerization reaction product or its hydrolysate of at least one monomer that is vinyl acetate, vinyl alcohol, butyl (meth)acrylate, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylenegylcol (meth)acrylate, 2-hydroxypropylenegylcol (meth)acrylate, acrylic acid, methacrylic acid, 2-(meth)acryloyloxyacetic acid, 3-(meth)acryloyloxypropanoic acid, 4 (meth)acryloyloxybutanoic acid, itaconic acid, maleic acid, 2-isocyanatoethyl (meth)acrylate, 3-isocyanatopropyl (meth)acrylate, 4-isocyanatobutyl (meth)acrylate, (meth)acrylamide, ethylene di(meth)acrylate, diethyleneglycol (meth)acrylate, triethylenegylcol di(meth)acrylate, trimethylol propane tri (meth)acrylate, trimethylol propane triacrylate, 1,3-butanediol (meth)acrylate, 1,6-hexanediol di(meth)acrylate, allyl acrylate, or N-vinylcaprolactam.

16. The negative active material of claim 1, wherein the second polymer is polyvinyl alcohol.

17. The negative active material of claim 1, wherein a weight ratio of the first polymer to the second polymer is in a range of about 1:99 to about 50:50.

18. The negative active material of claim 1, wherein the third polymer has a network structure in which a plurality of identical first polymers and a plurality of identical second polymers are cross-linked with each other.

19. The negative active material of claim 1, wherein the surface of the active material core further comprises a third functional group that is at least one of a carboxyl group, a hydroxyl group, an amide group, or an aldehyde group, and the active material core and the third polymer are cross-linked by a covalent bond that is formed by a reaction of the third functional group and the first functional group, the second functional group, or a combination thereof.

20. The negative active material of claim 1, wherein an amount of the polymer layer is in a range of about 0.01 parts to about 10 parts by weight based on 100 parts by weight of the active material core.

21. The negative active material of claim 1, wherein the active material core comprises at least one of a silicon active material, a tin active material, a silicon-tin alloy active material, or a silicon-carbon active material.

22. The negative active material of claim 1, wherein the active material core comprises a silicon-carbon composite.

23. The negative active material of claim 22, wherein the silicon-carbon composite comprises a silicon secondary particle in which silicon primary particles are agglomerated; and a carbonaceous material that comprises crystalline carbon, amorphous carbon, or a combination thereof.

24. The negative active material of claim 1, wherein the active material core has a porous structure.

25. The negative active material of claim 1, wherein the active material core comprises a porous silicon composite cluster,
wherein the porous silicon composite cluster comprises a core comprising a porous silicon composite secondary particle and a shell comprising a second graphene disposed on the core,
wherein the porous silicon composite secondary particle comprises
an agglomerate of at least two silicon composite primary particles, where each of the silicon composite primary particles comprises silicon;
a silicon oxide ($SiO_x$) (where $0<x<2$) disposed on the silicon; and
a first graphene disposed on the silicon oxide.

26. The negative active material of claim 1, wherein an average particle diameter (D50) of the negative active material is in a range of about 200 nanometers to about 50 micrometers, and a specific surface area of the negative active material is about 15 square meters per gram or less.

27. A lithium secondary battery comprising the negative active material of claim 1.

28. A method of manufacturing a negative active material, the method comprising:
mixing a first composition and a second composition to prepare a third composition, wherein,
the first composition comprises a first polymer and a non-aqueous solvent, the first polymer comprising a first functional group and being at least one of polyamic acid, polyimide, or a copolymer thereof,
the second composition comprises water and a second polymer comprising a second functional group, wherein the second polymer is water-soluble, and
at least one of the first polymer and the second polymer further comprises a halogen group;
contacting a surface of an active material core and the third composition to form a coated surface; and
heat-treating the coated surface at a temperature of about 160° C. or greater to form a polymer layer comprising a third polymer on the surface of the active material core, wherein the third polymer is a cross-linked product of the first polymer and the second polymer, and the first polymer and the second polymer are cross-linked by an ester bond that is formed by a reaction of the first functional group and the second functional group.

* * * * *